US012326691B2

(12) United States Patent
Hashimoto et al.

(10) Patent No.: US 12,326,691 B2
(45) Date of Patent: Jun. 10, 2025

(54) TONER

(71) Applicant: CANON KABUSHIKI KAISHA, Tokyo (JP)

(72) Inventors: Takeshi Hashimoto, Ibaraki (JP); Kazuki Murata, Tokyo (JP); Yukihiro Abe, Chiba (JP); Miki Ueda, Tokyo (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 729 days.

(21) Appl. No.: 17/656,282

(22) Filed: Mar. 24, 2022

(65) Prior Publication Data

US 2022/0326630 A1 Oct. 13, 2022

(30) Foreign Application Priority Data

Mar. 31, 2021 (JP) ................................. 2021-059005

(51) Int. Cl.
*G03G 9/087* (2006.01)
*G03G 9/08* (2006.01)

(52) U.S. Cl.
CPC ....... *G03G 9/08755* (2013.01); *G03G 9/0825* (2013.01); *G03G 9/08795* (2013.01)

(58) Field of Classification Search
CPC ............. G03G 9/0825; G03G 9/08764; G03G 9/08755; G03G 9/08711
See application file for complete search history.

(56) References Cited

U.S. PATENT DOCUMENTS

| | | | |
|---|---|---|---|
| 9,057,970 | B2 | 6/2015 | Ida et al. |
| 9,152,088 | B1 | 10/2015 | Kobori et al. |
| 9,348,247 | B2 | 5/2016 | Ida et al. |
| 9,348,253 | B2 | 5/2016 | Kanno et al. |
| 9,417,540 | B2 | 8/2016 | Hashimoto et al. |
| 9,436,112 | B2 | 9/2016 | Iwasaki et al. |
| 9,540,483 | B2 | 1/2017 | Ida et al. |
| 9,651,883 | B2 | 5/2017 | Hama et al. |
| 9,665,026 | B2 | 5/2017 | Iwasaki et al. |
| 9,696,644 | B2 | 7/2017 | Ida et al. |
| 9,897,934 | B2 | 2/2018 | Tamura et al. |
| 10,012,920 | B2 | 7/2018 | Shibata et al. |
| 10,036,970 | B2 | 7/2018 | Kanno et al. |
| 10,078,281 | B2 | 9/2018 | Ida et al. |
| 10,082,743 | B2 | 9/2018 | Hama et al. |
| 10,088,765 | B2 | 10/2018 | Miyakai et al. |
| 10,146,146 | B2 | 12/2018 | Komatsu et al. |
| 10,175,595 | B2 | 1/2019 | Onozaki et al. |
| 10,197,936 | B2 | 2/2019 | Onozaki et al. |
| 10,203,619 | B2 | 2/2019 | Yamashita et al. |
| 10,228,629 | B2 | 3/2019 | Tamura et al. |
| 10,274,851 | B2 | 4/2019 | Hashimoto et al. |
| 10,353,312 | B2 | 7/2019 | Kamae et al. |
| 10,401,748 | B2 | 9/2019 | Hashimoto et al. |
| 10,423,086 | B2 | 9/2019 | Hama et al. |
| 10,451,986 | B2 | 10/2019 | Sano et al. |
| 10,451,990 | B2 | 10/2019 | Kamae et al. |
| 10,474,049 | B2 | 11/2019 | Onozaki et al. |
| 10,514,624 | B2 | 12/2019 | Tamura et al. |
| 10,564,560 | B2 | 2/2020 | Onozaki et al. |
| 10,599,060 | B2 | 3/2020 | Kanno et al. |
| 10,656,545 | B2 | 5/2020 | Kamae et al. |
| 10,775,710 | B1 | 9/2020 | Kamae et al. |
| 10,859,931 | B2 | 12/2020 | Hashimoto et al. |
| 10,877,386 | B2 | 12/2020 | Murayama et al. |
| 10,969,705 | B2 | 4/2021 | Shirayama et al. |
| 11,029,617 | B2 | 6/2021 | Chimoto et al. |
| 11,131,939 | B2 | 9/2021 | Hama et al. |
| 11,181,848 | B2 | 11/2021 | Ochi et al. |
| 2006/0024603 | A1 | 2/2006 | Sato |
| 2013/0108955 | A1 | 5/2013 | Shibata et al. |
| 2013/0288173 | A1 | 10/2013 | Hashimoto et al. |
| 2014/0308611 | A1 | 10/2014 | Shimano |
| 2014/0329176 | A1 | 11/2014 | Kanno et al. |
| 2015/0099227 | A1 | 4/2015 | Ida et al. |
| 2015/0212444 | A1 | 7/2015 | Yamauchi |
| 2016/0109820 | A1 | 4/2016 | Hashimoto et al. |

(Continued)

FOREIGN PATENT DOCUMENTS

| | | |
|---|---|---|
| JP | 2006-39346 A | 2/2006 |
| JP | 2014-77987 A | 5/2014 |

(Continued)

OTHER PUBLICATIONS

Translation of JP-2014142632-A.*
U.S. Appl. No. 17/648,330, Hiroki Watanabe, filed Jan. 19, 2022.
U.S. Appl. No. 17/648,333, Ichiro Kanno, filed Jan. 19, 2022.
U.S. Appl. No. 17/648,368, Ichiro Kanno, filed Jan. 19, 2022.
U.S. Appl. No. 17/654,461, Yukihiro Abe, filed Mar. 11, 2022.
U.S. Appl. No. 17/654,481, Kazuki Murata, filed Mar. 11, 2022.
U.S. Appl. No. 17/659,084, Kouichirou Ochi, filed Apr. 13, 2022.
U.S. Appl. No. 17/663,935, Miki Ueda, filed May 18, 2022.
U.S. Appl. No. 17/664,102, Megumi Shino, filed May 19, 2022.

*Primary Examiner* — Peter L Vajda
(74) *Attorney, Agent, or Firm* — VENABLE LLP

(57) ABSTRACT

A toner comprising a toner particle comprising a binder resin, wherein the binder resin comprises a first resin and a second resin, the first resin is a crystalline resin, the second resin is an amorphous resin, and in observations of cross sections of 100 toner particles using a transmission electron microscope, (i) when an area ratio A (area %) denotes a ratio of an area occupied by the first resin in each of cross sections of the toner particles, an average value of the area ratio A is 30 to 75 area %, and (ii) when X denotes the number of cross sections of the toner particle for which the area ratio A is 90 area % or more and Z denotes the total number of cross sections of observed toner particles, then a value of X/Z is 0.15 or more.

8 Claims, No Drawings

(56) References Cited

U.S. PATENT DOCUMENTS

| | | | |
|---|---|---|---|
| 2017/0315461 | A1 | 11/2017 | Komatsu |
| 2018/0314176 | A1 | 11/2018 | Ikeda et al. |
| 2021/0141315 | A1 | 5/2021 | Kamae et al. |
| 2021/0181647 | A1 | 6/2021 | Hashimoto et al. |
| 2021/0181649 | A1 | 6/2021 | Kanno et al. |
| 2021/0181650 | A1 | 6/2021 | Hama et al. |
| 2021/0181651 | A1 | 6/2021 | Kanno et al. |
| 2021/0278774 | A1 | 9/2021 | Hashimoto et al. |
| 2021/0278775 | A1 | 9/2021 | Kamae et al. |
| 2021/0302853 | A1 | 9/2021 | Murata et al. |
| 2021/0302854 | A1 | 9/2021 | Kitamura et al. |
| 2022/0050398 | A1 | 2/2022 | Ooyama et al. |
| 2022/0187728 | A1 | 6/2022 | Miura et al. |
| 2022/0197163 | A1 | 6/2022 | Kajihara et al. |
| 2022/0197166 | A1 | 6/2022 | Chimoto et al. |
| 2022/0197174 | A1 | 6/2022 | Kajihara et al. |

FOREIGN PATENT DOCUMENTS

| | | | | | |
|---|---|---|---|---|---|
| JP | 2014-130243 | A | | 7/2014 | |
| JP | 2014142632 | A | * | 8/2014 | ........... G03G 9/0825 |
| JP | 2017-198869 | A | | 11/2017 | |
| JP | 2018-36622 | A | | 3/2018 | |
| JP | 2019-219643 | A | | 12/2019 | |

* cited by examiner

TONER

BACKGROUND OF THE INVENTION

Field of the Invention

The present disclosure relates to a toner used in electrophotography systems, electrostatic recording systems, electrostatic printing systems, toner jet systems, and the like.

Description of the Related Art

As electrophotographic full color copiers have proliferated in recent years, there has been increased demand for higher printer speeds and greater energy savings. To achieve high-speed printing, techniques have been studied for melting the toner more rapidly in the fixing step. Techniques have also been studied for reducing the various control times within jobs and between jobs in order to increase productivity. As strategies for saving energy, techniques have been studied for fixing the toner at a lower temperature in order to reduce the energy expenditure in the fixing step.

It is known that using a crystalline resin having sharp melt properties as a primary component of a binder resin of a toner achieves superior low-temperature fixability compared to a toner in which a primary component is an amorphous resin. A toner has been proposed in which a crystalline polyester or a crystalline vinyl resin is used as a resin having sharp melt properties.

For example, Japanese Patent Application Publication No. 2014-130243 proposes a toner that achieves both low-temperature fixability and heat-resistant storage stability by using a side-chain crystalline acrylate resin. The toner disclosed in this document can achieve both low-temperature fixability and heat-resistant storage stability.

However, it has been found that a toner in which a crystalline vinyl resin is used as a binder resin has an excessively low viscosity in a high temperature region, and therefore suffers from hot offset and wraparound, and has a narrow temperature range in which fixing is possible.

As a result, investigations have been carried out into addition of amorphous resins to crystalline resins in order to increase the viscosity of a toner after melting. For example, Japanese Patent Application Publication No. 2014-142632 proposes a toner obtained using a binder resin that contains both a crystalline vinyl resin and an amorphous resin.

SUMMARY OF THE INVENTION

The toner disclosed in Japanese Patent Application Publication No. 2014-142632 can ensure a certain fixing temperature range, but it has been found that further improvements are required in terms of image durability and so on. The present disclosure proposes a toner which exhibits both low-temperature fixability during high speed printing and hot offset resistance and which also exhibits favorable image durability.

A toner comprising a toner particle comprising a binder resin, wherein the binder resin comprises a first resin and a second resin,
the first resin is a crystalline resin,
the second resin is an amorphous resin, and
in observations of cross sections of 100 toner particles using a transmission electron microscope,
(i) when an area ratio A (area %) denotes a ratio of an area occupied by the first resin in each of cross sections of the toner particles, an average value of the area ratio A is 30 to 75 area %, and
(ii) when X denotes the number of cross sections of the toner particle for which the area ratio A is 90 area % or more and Z denotes the total number of cross sections of observed toner particles, then a value of X/Z is 0.15 or more.

According to the present disclosure, it is possible to provide a toner which exhibits both low-temperature fixability during high speed printing and hot offset resistance and which also exhibits favorable image durability. Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present disclosure include the numbers at the upper and lower limits of the range. In the present disclosure, a (meth)acrylic acid ester means an acrylic acid ester and/or a methacrylic acid ester. When numerical ranges are described in stages, the upper and lower limits of each of each numerical range may be combined arbitrarily. The term "monomer unit" describes a reacted form of a monomeric material in a polymer. For example, one carbon-carbon bonded section in a principal chain of polymerized vinyl monomers in a polymer is given as one unit. A vinyl monomer can be represented by the following formula (Z):

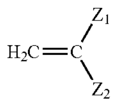
(Z)

in formula (Z), $Z_1$ represents a hydrogen atom or alkyl group (preferably a $C_{1-3}$ alkyl group, or more preferably a methyl group), and $Z_2$ represents any substituent.
A crystalline resin is a resin exhibiting a clear endothermic peak in differential scanning calorimetry (DSC) measurement.

The present disclosure relates to a toner comprising a toner particle comprising a binder resin, wherein the binder resin comprises a first resin and a second resin,
the first resin is a crystalline resin,
the second resin is an amorphous resin, and
in observations of cross sections of 100 toner particles using a transmission electron microscope,
(i) when an area ratio A (area %) denotes a ratio of an area occupied by the first resin in each of cross sections of the toner particles, an average value of the area ratio A is 30 to 75 area %, and
(ii) when X denotes the number of cross sections of the toner particle for which the area ratio A is 90 area % or more and Z denotes the total number of cross sections of observed toner particles, then a value of X/Z is 0.15 or more.

The inventors of the present invention found that hot offset resistance was not necessarily improved in cases where a large amount of crystalline resin was used as a binder resin and in cases where an amorphous resin was also used. It was understood that low-temperature fixability and hot offset resistance both decreased in some cases.

In addition, images coated on paper that is generally called known as coated paper, which is obtained by coating the surface of paper with an inorganic substance such as calcium carbonate or clay, suffer from problems such as image peeling caused by rubbing between an image and another coated paper. During investigations into types and proportions of crystalline resins and amorphous resins, the inventors of the present invention found that in cases where toner particles having different contained amounts of crystalline resins and amorphous resins were used, excellent low-temperature fixability and fixing latitude could be achieved and image durability tended to improve. The toner mentioned above was achieved by carrying out further diligent research on the basis of these findings.

The toner is characterized by comprising a crystalline resin that is a first resin and an amorphous resin that is a second resin. Furthermore, the toner is characterized in that in observations of cross sections of 100 toner particles using a transmission electron microscope, when an area ratio A (area %) denotes a ratio of an area occupied by the first resin in each of cross sections of the toner particles, an average value of the area ratio A is 30 to 75 area %.

The area ratio A illustrates the abundance ratio of the crystalline resin that is the first resin in the toner particle. If the average value of the area ratio A is 30 to 75 area %, the advantageous effect of the sharp melt properties derived from the crystalline resin is exhibited and a toner is formed that exhibits excellent low-temperature fixability and hot offset resistance. If the average value of the area ratio A is less than 30 area %, low-temperature fixability deteriorates. However, if the average value of the area ratio A exceeds 75 area %, hot offset resistance deteriorates. The average value of the area ratio A is preferably 38 to 73 area %.

In addition, the toner is characterized in that when X denotes the number of cross sections of the toner particle for which the area ratio A is 90 area % or more and Z denotes the total number of cross sections of observed toner particles, then the value of X/Z is 0.15 or more. This shows that toner particles in which the abundance ratio of the crystalline resin is high are present at a certain amount or more in the toner. In this way, if toner particles having an area ratio A that is higher than the average value of the area ratio A are present at a certain amount or more in the toner, it is possible to achieve excellent low-temperature fixability and hot offset resistance and improve image durability on coated paper. If the value of X/Z is less than 0.15, it is not possible to achieve excellent low-temperature fixability and hot offset resistance, and image durability deteriorates. The value of X/Z is preferably 0.17 or more. The upper limit for the value of X/Z is not particularly limited, but is preferably 0.45 or less, and more preferably 0.37 or less.

The inventors of the present invention think that the mechanism for this is as follows. Because the toner is such that the average value of the area ratio A is 30 to 75 area %, it can be said that the toner particle comprises certain amounts of the crystalline resin and the amorphous resin. An effect of improving low-temperature fixability due to the sharp melt properties of the crystalline resin and an effect of achieving hot offset resistance due to the amorphous resin can be expected, but the effects mentioned above are not achieved by this alone. This is thought to be because the crystalline resin present in the toner particle cannot achieve the expected sharp melt properties at the time of fixing because the amorphous resin which is also present in the same toner particle inhibits sharp melt properties.

However, in a toner in which the area ratio A is 90 area % or more, the abundance ratio of the amorphous resin in the toner particle is low. As a result, the overall toner particle exhibits high sharp melt properties and melts before other toner particles. It is thought that the effect of embedding voids between toner particles occurs as a result of this, the proportion of air that serves as a thermal insulation layer decreases, and the overall toner therefore exhibits improved low-temperature fixability. Furthermore, it is thought that because voids in a formed image, which are derived from voids present between toner particles, decrease in number, locations where stress is concentrated when an external force is applied decrease in number and image durability is improved.

The following method can be given as an example of a method for producing a toner in which the area ratio A falls within the range mentioned above. A toner particle group (referred to as toner particle group 1) in which the average value of the area ratio A falls within the range 30 to 75 area % is produced by controlling the proportions of the crystalline resin and the amorphous resin. Separately, another toner particle group (referred to as toner particle group 2) that comprises toner particles for which the area ratio A is 90 area % or more is also produced. Next, a toner can be produced by mixing toner particle group 1 and toner particle group 2 within the range mentioned above.

Moreover, it is thought that in toner particles produced using ordinary toner production methods, such as melt kneading methods, emulsion aggregation methods, dissolution suspension methods and emulsion polymerization methods, a certain distribution of the area ratio A occurs. However, in cases where a toner is produced using a conventional known production method, variations in the area ratio A are within ±5 area % of the average value.

From the perspective of improving image gloss, a cross section of a toner particle for which the average value of the area ratio A is 30 to 75 area % preferably have a matrix-domain structure constituted from a matrix comprising the first resin and domains comprising the second resin. In this case, a number average length of long axes of the domains (a number average diameter of long axes of the domains) is preferably 0.1 to 2.0 μm, and more preferably 0.5 to 1.4 μm.

The toner comprises the first resin that is a crystalline resin. Low-temperature fixability is improved by comprising the crystalline resin. A well-known crystalline resin can be used as the crystalline resin used in the toner.

Suitable examples include crystalline polyester resins, crystalline vinyl resins, crystalline polyurethane resins, and crystalline polyurea resins. Other examples include ethylene copolymers such as ethylene-vinyl acetate copolymer, ethylene-methyl acrylate copolymer, ethylene-ethyl acrylate copolymer, ethylene-butyl acrylate copolymer, ethylene-methyl methacrylate copolymer, ethylene-methacrylic acid copolymer, ethylene-acrylic acid copolymer, and the like.

Of these, crystalline polyester resins and crystalline vinyl resins are preferred from the perspective of low-temperature fixability. In addition, a hybrid resin in which a vinyl resin and a polyester resin are bound to each other may be used. Moreover, the vinyl resin is a polymer or copolymer of a compound containing a group having an ethylenically unsaturated bond such as a vinyl bond. Examples of groups having an ethylenically unsaturated bond include vinyl groups, (meth)allyl groups and (meth)acryloyl groups.

The crystalline polyester resin is preferably a condensation polymerization product of a monomer composition containing an aliphatic diol having from 2 to 22 carbon atoms and an aliphatic dicarboxylic acid having from 2 to 22 carbon atoms as primary components. The crystalline polyester resin is more preferably a condensation polymerization product of a monomer containing an alcohol component selected from among aliphatic diols having from 6 to 12 carbon atoms as a primary component and a monomer containing a carboxylic acid component selected from among aliphatic dicarboxylic acid compounds having from 6 to 12 carbon atoms as a primary component.

The aliphatic diol having from 2 to 22 carbon atoms (and more preferably from 6 to 12 carbon atoms) is not particularly limited, but is preferably a chain-like (and more preferably a straight chain-like) aliphatic diol, examples of which include ethylene glycol, diethylene glycol, triethylene glycol, 1,2-propane diol, 1,3-propane diol, dipropylene glycol, 1,4-butane diol, 1,4-butadiene glycol, trimethylene glycol, tetramethylene glycol, pentamethylene glycol, hexamethylene glycol, octamethylene glycol, nonamethylene glycol, decamethylene glycol, dodecamethylene glycol and neopentyl glycol. Of these, 1,6-hexane diol, 1,10-decane diol and 1,12-dodecane diol are preferred.

The term "primary component" means a component whose content is 50 mass % or more. This content is preferably 70 mass % or more, and more preferably 90 mass % or more. A polyhydric alcohol monomer other than the aliphatic diols mentioned above can be used. Among the polyhydric alcohol monomers, examples of dihydric alcohol monomers include aromatic alcohols such as polyoxyethylene-modified bisphenol A and polyoxypropylene-modified bisphenol A; and 1,4-cyclohexanedimethanol.

Among these polyhydric alcohol monomers, examples of trihydric or higher alcohol monomers include aromatic alcohols such as 1,3,5-trihydroxymethylbenzene; and aliphatic alcohols such as pentaerythritol, dipentaerythritol, tripentaerythritol, 1,2,4-butane triol, 1,2,5-pentane triol, glycerin, 2-methylpropane triol, 2-methyl-1,2,4-butane triol, trimethylolethane and trimethylolpropane.

Furthermore, a monohydric alcohol may be used as long as the properties of the crystalline polyester resin are not impaired. Examples of monohydric alcohols include monofunctional alcohols such as n-butanol, isobutanol, sec-butanol, n-hexanol, n-octanol, lauryl alcohol, 2-ethylhexanol, decanol, cyclohexanol, benzyl alcohol and dodecyl alcohol.

However, the aliphatic dicarboxylic acid compound having from 2 to 22 carbon atoms (and more preferably from 6 to 12 carbon atoms) is not particularly limited, but is preferably a chain-like (and more preferably a straight chain-like) aliphatic dicarboxylic acid. Specific examples thereof include oxalic acid, malonic acid, succinic acid, glutaric acid, adipic acid, pimelic acid, suberic acid, glutaconic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, maleic acid, fumaric acid, mesaconic acid, citraconic acid and itaconic acid, and compound obtained by hydrolyzing acid anhydrides and lower alkyl esters of these are also included. More preferred examples include adipic acid, sebacic acid and 1,10-decanedicarboxylic acid.

It is possible to use a polycarboxylic acid other than the aliphatic dicarboxylic acid compound having from 2 to 22 carbon atoms. Among these other polycarboxylic acid monomers, examples of dihydric carboxylic acids include aromatic carboxylic acids such as isophthalic acid and terephthalic acid; aliphatic carboxylic acids such as n-dodecylsuccinic acid and n-dodecenylsuccinic acid; and alicyclic carboxylic acids such as cyclohexane dicarboxylic acid, and acid anhydrides and lower alkyl esters of these are also included.

Among these other carboxylic acid monomers, examples of trihydric or higher polycarboxylic acids include aromatic carboxylic acids such as 1,2,4-benzenetricarboxylic acid (trimellitic acid), 2,5,7-naphthalenetricarboxylic acid, 1,2,4-naphthalenetricarboxylic acid and pyromellitic acid; aliphatic carboxylic acids such as 1,2,4-butanetricarboxylic acid, 1,2,5-hexanetricarboxylic acid and 1,3-dicarboxyl-2-methyl-2-methylenecarboxypropane, and derivatives such as anhydrides and lower alkyl esters of these.

Furthermore, a monohydric carboxylic acid may be contained as long as the properties of the crystalline polyester resin are not impaired. Examples of monohydric carboxylic acids include monocarboxylic acids such as benzoic acid, naphthalenecarboxylic acid, salicylic acid, 4-methylbenzoic acid, 3-methylbenzoic acid, phenoxyacetic acid, biphenylcarboxylic acid, acetic acid, propionic acid, butyric acid, octanoic acid, decanoic acid, dodecanoic acid and stearic acid.

The crystalline polyester resin can be produced using an ordinary polyester synthesis method. For example, a desired crystalline polyester resin can be obtained by subjecting the aforementioned carboxylic acid monomers and alcohol monomers to an esterification reaction or a transesterification reaction, and then carrying out a condensation polymerization reaction using an ordinary method, either under reduced pressure or after introducing nitrogen gas.

The esterification or transesterification reaction can, if necessary, be carried out using an ordinary esterification catalyst or transesterification catalyst such as sulfuric acid, titanium butoxide, dibutyl tin oxide, manganese acetate or magnesium acetate. In addition, the condensation polymerization reaction can be carried out using an ordinary polymerization catalyst, for example a well-known catalyst such as titanium butoxide, dibutyl tin oxide, tin acetate, zinc acetate, tin disulfide, antimony trioxide and germanium dioxide. The polymerization temperature and the amount of catalyst are not particularly limited, and should be decided as appropriate.

In order to increase the strength of a crystalline polyester resin obtained in an esterification reaction, a transesterification reaction or a condensation polymerization reaction, it is possible to charge all the monomers at once or use a method such as first reacting divalent monomers in order to reduce the amount of low molecular weight components and then add and react trivalent or higher monomers.

Furthermore, the first resin is more preferably a vinyl resin, and preferably comprises a first monomer unit represented by formula (1) below. More preferably, the first resin represented by formula (1) is a vinyl resin having the first monomer unit represented by formula (1) below. In addition, the content of the first monomer unit in the first resin is preferably 20.0 to 100.0 mass %. Within this range, low-temperature fixability and hot offset resistance tend to be achieved. The weight average molecular weight (Mw) of the first resin is preferably 5000 to 100,000, and more preferably 15,000 to 70,000.

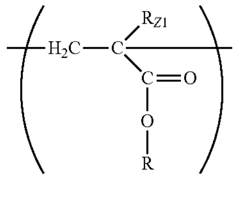

(1)

In formula (1), $R_{Z1}$ denotes a hydrogen atom or a methyl group, and R denotes and alkyl group having 18 to 36 carbon atoms. R is preferably an alkyl group having 18 to 30 carbon atoms. In addition, this alkyl group preferably has a straight chain structure.

The first monomer unit represented by formula (1) has an alkyl group having 18 to 36 carbon atoms represented by R in a side chain, and by having this portion, the first resin tends to exhibit crystallinity. If the content of the first monomer unit in the first resin is 20.0 to 100.0 mass %, the first resin exhibits crystallinity and low-temperature fixability tends to be further improved. This content is preferably at least 40.0 mass %, and more preferably at least 50.0 mass %. The upper limit for this content is not particularly limited, but is preferably 90.0 mass % or less, and more preferably 80.0 mass % or less, in cases where another monomer unit mentioned below is contained.

In addition, the crystalline resin having a first monomer unit represented by formula (1) exhibits superior charge maintaining properties in high temperature high humidity environments in comparison with crystalline polyesters that are crystalline resins that were well known in the past, possibly because of a structure exhibiting crystallinity in a side chain.

The first monomer unit represented by formula (1) is preferably a monomer unit derived from at least one type selected from the group consisting of (meth)acrylic acid esters having an alkyl group with 18 to 36 carbon atoms.

Examples of (meth)acrylic acid esters each having a $C_{18-36}$ alkyl group include (meth)acrylic acid esters each having a $C_{18-36}$ straight-chain alkyl group [stearyl (meth) acrylate, nonadecyl (meth)acrylate, eicosyl (meth)acrylate, heneicosanyl (meth)acrylate, behenyl (meth)acrylate, lignoceryl (meth)acrylate, ceryl (meth)acrylate, octacosyl (meth) acrylate, myricyl (meth)acrylate, dotriacontyl (meth)acrylate, etc.] and (meth)acrylic acid esters each having a $C_{18-36}$ branched alkyl group [2-decyltetradecyl (meth)acrylate, etc.].

Of these, from the viewpoint of low-temperature fixability of a toner, at least one selected from the group consisting of (meth)acrylic acid esters having a linear alkyl group having from 18 to 36 carbon atoms is preferable, at least one selected from the group consisting of (meth)acrylic acid esters having a linear alkyl group having from 18 to 30 carbon atoms is more preferable, and at least one selected from the group consisting of a linear stearyl (meth)acrylate and behenyl (meth)acrylate is even more preferable. As the monomer forming the first monomer unit, one type may be used alone, or two or more types may be used in combination.

The first resin may contain another monomer unit in addition to the first monomer unit represented by formula (1). In a case where the first resin is a vinyl resin, examples of polymerizable monomers for forming this other monomer unit include those listed below. In addition, the polymerizable monomer that forms the other monomer unit may be a single monomer or a combination of two or more types.

Nitrile group-containing monomers; for example, acrylonitrile and methacrylonitrile.

Hydroxyl group-containing monomers; for example, 2-hydroxyethyl (meth)acrylate and 2-hydroxypropyl (meth) acrylate.

A monomer having an amide group; for example, acrylamide and a monomer obtained by reacting an amine having from 1 to 30 carbon atoms and a carboxylic acid having from 2 to 30 carbon atoms and an ethylenically unsaturated bond (acrylic acid, methacrylic acid, and the like) by a known method.

A monomer having a urea group; for example, a monomer obtained by reacting an amine having from 3 to 22 carbon atoms [primary amines (normal butylamine, t-butylamine, propylamine, isopropylamine, and the like), secondary amines (dinormalethylamine, dinormalpropylamine, dinormal butylamine, and the like), aniline, cyclohexylamine, and the like] with an isocyanate having from 2 to 30 carbon atoms and an ethylenically unsaturated bond by a known method.

A monomer having a carboxy group; for example, methacrylic acid, acrylic acid, and 2-carboxyethyl (meth)acrylate.

Vinyl esters; for example, vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate and vinyl octanoate.

In addition, styrene and derivatives thereof, such as styrene and o-methylstyrene; and (meth)acrylic acid esters, such as methyl (meth)acrylate, n-butyl (meth)acrylate, t-butyl (meth)acrylate and 2-ethylhexyl (meth)acrylate. Unsaturated monoolefins such as ethylene, propylene, butylene and isobutylene; and unsaturated polyenes such as butadiene and isoprene.

Aromatic divinyl compounds; diacrylate compounds linked by alkyl chains; diacrylate compounds linked by ether bond-containing alkyl chains; diacrylate compounds linked by chains including aromatic groups and ether bonds; polyester type diacrylate compounds; and polyfunctional crosslinking agents. Examples of such aromatic divinyl compounds include divinylbenzene and divinylnaphthalene.

Examples of such diacrylate compounds linked by alkyl chains include ethylene glycol diacrylate, 1,3-butylene glycol diacrylate, 1,4-butane diol diacrylate, 1,5-pentane diol diacrylate, 1,6-hexane diol diacrylate, neopentyl glycol diacrylate and compounds in which the acrylate moiety in the compounds mentioned above is replaced with a methacrylate moiety.

Of these, use of a monomer having a nitrile group, an amide group, a urethane group, a hydroxyl group or a urea group is preferred. More preferably, a monomer having an ethylenically unsaturated bond and at least one type of functional group selected from the group consisting of a nitrile group, an amide group, a urethane group, a hydroxyl group and a urea group is preferable. By using these monomers, charge rising performance in low humidity environments is further improved.

The first resin preferably comprises a monomer unit represented by formula (A) below, which is obtained by polymerizing styrene, and a monomer unit represented by formula (B) below, which is obtained by polymerizing (meth)acrylic acid. The content of the monomer unit represented by formula (A) is preferably 5.0 to 80.0 mass %, and more preferably 8.0 to 70.0 mass %. The content of the monomer unit represented by formula (B) is preferably 0.1 to 5.0 mass %, and more preferably 0.2 to 2.0 mass %.

(A)

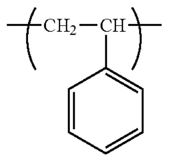

-continued (B)

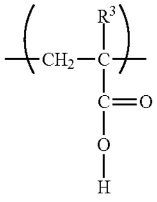

In the formula, $R^3$ denotes a hydrogen atom or a methyl group. In a case where the first resin is a vinyl resin, the resin can be produced using the polymerizable monomers mentioned above and a polymerization initiator. From the perspective of efficiency, the polymerization initiator can be used at an amount of from 0.05 parts by mass to 10 parts by mass relative to 100 parts by mass of polymerizable monomers.

Examples of the polymerization initiator include the types listed below. 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate, 1,1'-azobis(1-cyclohexanecarbonitrile), 2-carbamoylazoisobutyronitrile, 2,2'-azobis(2,4,4-trimethylpentane), 2-phenylazo-2,4-dimethyl-4-methoxyvaleronitrile, 2,2'-azobis(2-methylpropane), ketone peroxides such as methyl ethyl ketone peroxide, acetylacetone peroxide and cyclohexanone peroxide, 2,2-bis(tert-butylperoxy)butane, tert-butyl hydroperoxide, cumene hydroperoxide, 1,1,3,3-tetramethylbutyl hydroperoxide, di-tert-butyl peroxide, tert-butylcumyl peroxide, dicumyl peroxide, α,α'-bis(tert-butylperoxyisopropyl)benzene, isobutyl peroxide, octanoyl peroxide, decanoyl peroxide, lauroyl peroxide, 3,5,5-trimethylhexanoyl peroxide, benzoyl peroxide, m-toluoyl peroxide, diisopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate, di(3-methyl-3-methoxybutyl) peroxycarbonate, acetylcyclohexylsulfonyl peroxide, tert-butyl peroxyacetate, tert-butyl peroxyisobutyrate, tert-butyl peroxyneodecanoate, tert-butylperoxy-2-ethylhexanoate, tert-butyl peroxylaurate, tert-butyl peroxybenzoate, tert-butyl peroxyisopropyl carbonate, di-tert-butyl peroxyisophthalate, tert-butyl peroxyallyl carbonate, tert-amyl peroxy-2-ethylhexanoate, di-tert-butyl peroxyhexahydroterephthalate and di-tert-butyl peroxyazelate.

The binder resin comprises the second resin, and the second resin is an amorphous resin. A well-known amorphous resin can be used as the amorphous resin. Examples thereof include the types listed below.

Poly(vinyl chloride), phenol resins, natural resin-modified phenol resins, natural resin-modified maleic acid resins, poly(vinyl acetate) resins, silicone resins, polyester resins, polyurethane resins, polyamide resins, furan resins, epoxy resins, xylene resins, poly(vinyl butyral) resins, terpene resins, coumarone-indene resins, petroleum-based resins and vinyl resins. Of these, the second resin preferably contains at least one type of resin selected from the group consisting of a hybrid resin in which a vinyl resin and a polyester resin are bound to each other, a polyester resin and a vinyl resin.

As the polyester resin, a polyester resin usually used for toner can be preferably used. Monomers to be used in the polyester resin include polyhydric alcohols (dihydric or trihydric or higher alcohols), polyvalent carboxylic acids (divalent or trivalent or higher carboxylic acids), acid anhydrides thereof or lower alkyl esters thereof.

Examples of the polyhydric alcohols include the following. Examples of the dihydric alcohol include the following bisphenol derivatives. Polyoxypropylene-(2.2)-2,2-bis(4-hydroxyphenyl)propane, polyoxypropylene-(3.3)-2,2-bis(4-hydroxyphenyl)propane, polyoxyethylene-(2.0)-2,2-bis(4-hydroxyphenyl)propane, polyoxypropylene-(2.0)-polyoxyethylene-(2.0)-2,2-bis(4-hydroxyphenyl)-propane, polyoxypropylene-(6)-2,2-bis(4-hydroxyphenyl)propane, and the like.

Examples of other polyhydric alcohols include ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, trimethylolpropane, and 1,3,5-trihydroxymethylbenzene. These polyhydric alcohols can be used alone or in combination of two or more.

Examples of the polyvalent carboxylic acid include the following. Examples of the divalent carboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, anhydrides of these acids and lower alkyl esters thereof. Of these, maleic acid, fumaric acid, terephthalic acid, and n-dodecenylsuccinic acid are preferably used.

Examples of the trivalent or higher carboxylic acid, acid anhydrides thereof or lower alkyl esters thereof include the following. 1,2,4-Benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimeric acid, acid anhydrides thereof or lower alkyl esters thereof.

Of these, derivatives such as 1,2,4-benzenetricarboxylic acid (trimellitic acid) or an acid anhydride thereof are preferably used because of low cost and easiness of reaction control. These polyvalent carboxylic acids can be used alone or in combination of two or more.

The method for producing the polyester resin is not particularly limited, and a publicly known method can be used. For example, the polyester resin can be produced by simultaneously charging a polyhydric alcohol and polycarboxylic acid mentioned above and then polymerizing by means of an esterification reaction, a transesterification reaction or a condensation reaction. In addition, the polymerization temperature is not particularly limited, but preferably falls within the range of from 180° C. to 290° C. When polymerizing the polyester resin, it is possible to use a polymerization catalyst such as a titanium-based catalyst, a tin-based catalyst, zinc acetate, antimony trioxide or germanium dioxide. The polyester resin used in the amorphous resin is preferably obtained through condensation polymerization using a titanium-based catalyst and/or a tin-based catalyst.

Examples of the vinyl resin used as the second resin include polymers of polymerizable monomers that include an ethylenically unsaturated bond. An ethylenically unsaturated bond is a carbon-carbon double bond capable of radical polymerization, and examples thereof include vinyl groups, propenyl groups, acryloyl groups and methacryloyl groups.

Examples of the polymerizable monomer include the types listed below. Styrene-based monomers such as styrene, o-methylstyrene, m-methylstyrene, p-methylstyrene, p-phenylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene and p-nitrostyrene; acrylic acid and acrylic acid esters, such as acrylic acid, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate and phenyl acrylate; a-methylene aliphatic monocarboxylic acids and esters thereof, such as methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; and acrylonitrile, methacrylonitrile, acrylamide, and the like.

Also, acrylic acid and methacrylic acid esters, such as 2-hydroxyethyl acrylate, 2-hydroxyethyl methacrylate and 2-hydroxypropyl (meth)acrylate; and hydroxyl group-containing polymerizable monomers such as 4-(1-hydroxy-1-methylbutyl)styrene and 4-(1-hydroxy-1-methylhexyl)styrene. It is possible to use one of these polymerizable monomers in isolation or a combination of a plurality of types thereof.

If necessary, a variety of polymerizable monomers capable of vinyl polymerization may additionally be used in the vinyl resin in addition to the monomers mentioned above. Examples of such polymerizable monomers include the types listed below. Unsaturated monoolefins, such as ethylene, propylene, butylene and isobutylene; unsaturated polyenes, such as butadiene and isoprene; halogenated vinyl compounds, such as vinyl chloride vinylidene chloride, vinyl bromide and vinyl fluoride; vinyl esters, such as vinyl acetate, vinyl propionate and vinyl benzoate; vinyl ethers, such as vinyl methyl ether, vinyl ethyl ether and vinyl isobutyl ether; vinyl ketones, such as vinyl methyl ketone, vinyl hexyl ketone and methyl isopropenyl ketone; N-vinyl compounds, such as N-vinylpyrrole, N-vinylcarbazole, N-vinylindole and N-vinylpyrrolidone; vinylnaphthalene compounds; unsaturated dibasic acids, such as maleic acid, citraconic acid, itaconic acid, alkenylsuccinic acid compounds, fumaric acid and mesaconic acid; unsaturated dibasic acid anhydrides, such as maleic acid anhydride, citraconic acid anhydride, itaconic acid anhydride and alkenylsuccinic acid anhydride compounds; half esters of unsaturated dibasic acids, such as methyl maleate half ester, ethyl maleate half ester, butyl maleate half ester, methyl citraconate half ester, ethyl citraconate half ester, butyl citraconate half ester, methyl itaconate half ester, methyl alkenylsuccinate half esters, methyl fumarate half ester and ethyl mesaconate half ester; unsaturated dibasic acid esters, such as dimethyl maleate and dimethyl fumarate; anhydrides of α,β-unsaturated acid such as acrylic acid, methacrylic acid, crotonic acid and cinnamic acid; anhydrides of these α,β-unsaturated acids and lower fatty acids; and carboxylic acid group-containing polymerizable monomers, such as alkenylmalonic acid compounds, alkenylglutaric acid compounds, alkenyladipic acid compounds, and anhydrides and monoesters of these.

In addition, the vinyl resin may, if necessary, be a polymer that is crosslinked using a crosslinkable polymerizable monomer such as those exemplified below. Examples of the crosslinkable polymerizable monomer include the types listed below. Aromatic divinyl compounds; diacrylate compounds linked by alkyl chains; diacrylate compounds linked by ether bond-containing alkyl chains; diacrylate compounds linked by chains including aromatic groups and ether bonds; polyester type diacrylate compounds; and polyfunctional crosslinking agents. Examples of such aromatic divinyl compounds include divinylbenzene and divinylnaphthalene.

Examples of such diacrylate compounds linked by alkyl chains include ethylene glycol diacrylate, 1,3-butylene glycol diacrylate, 1,4-butane diol diacrylate, 1,5-pentane diol diacrylate, 1,6-hexane diol diacrylate, neopentyl glycol diacrylate and compounds in which the acrylate moiety in the compounds mentioned above is replaced with a methacrylate moiety.

The vinyl resin is preferably a polymer of polymerizable monomers including at least one type selected from the group consisting of styrene, o-methylstyrene, m-methylstyrene, p-methylstyrene, p-phenylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, p-nitrostyrene, acrylic acid, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, 2-chloroethyl acrylate, phenyl acrylate, methacrylic acid, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate, acrylonitrile, methacrylonitrile, acrylamide, 2-hydroxyethyl acrylate, 2-hydroxyethyl methacrylate, 2-hydroxypropyl methacrylate, 4-(1-hydroxy-1-methylbutyl)styrene and 4-(1-hydroxy-1-methylhexyl)styrene.

In addition, the vinyl resin may be a copolymer of at least one type of polymerizable monomer selected from among the group listed above and at least one type of crosslinkable polymerizable monomer selected from the group consisting of divinylbenzene, divinylnaphthalene, ethylene glycol diacrylate, 1,3-butylene glycol diacrylate, 1,4-butane diol diacrylate, 1,5-pentane diol diacrylate, 1,6-hexane diol diacrylate, neopentyl glycol diacrylate, ethylene glycol dimethacrylate, 1,3-butylene glycol dimethacrylate, 1,4-butane diol dimethacrylate, 1,5-pentane diol dimethacrylate, 1,6-hexane diol dimethacrylate and neopentyl glycol dimethacrylate. The content of the crosslinkable monomer in monomer can be approximately 0.5 to 5.0 mass %.

The vinyl resin may be produced using a polymerization initiator. From the perspective of efficiency, the polymerization initiator can be used at an amount of from 0.05 parts by mass to 10 parts by mass relative to 100 parts by mass of polymerizable monomers. Examples of the polymerization initiator include the types listed below.

2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobisisobutyrate, 1,1'-azobis(1-cyclohexanecarbonitrile), 2-carbamoylazoisobutyronitrile, 2,2'-azobis(2,4,4-trimethylpentane), 2-phenylazo-2,4-dimethyl-4-methoxyvaleronitrile, 2,2'-azobis(2-methylpropane), ketone peroxides such as methyl ethyl ketone peroxide, acetylacetone peroxide and cyclohexanone peroxide, 2,2-bis(tert-butylperoxy)butane, tert-butyl hydroperoxide, cumene hydroperoxide, 1,1,3,3-tetramethylbutyl hydroperoxide, di-tert-butyl peroxide, tert-butylcumyl peroxide, dicumyl peroxide, α,α'-bis(tert-butylperoxyisopropyl)benzene, isobutyl peroxide, octanoyl peroxide, decanoyl peroxide, lauroyl peroxide, 3,5,5-trimethylhexanoyl peroxide, benzoyl peroxide, m-toluoyl peroxide, diisopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate, di(3-methyl-3-methoxybutyl) peroxycarbonate, acetylcyclohexylsulfonyl peroxide, tert-butyl peroxyacetate, tert-butyl peroxyisobutyrate, tert-butyl peroxyneodecanoate, tert-butylperoxy-2-ethylhexanoate, tert-butyl peroxylaurate, tert-butyl peroxybenzoate, tert-butyl peroxyisopropyl carbonate, di-tert-butyl peroxyisophthalate, tert-butyl peroxyallyl carbonate, tert-amyl peroxy-2-ethylhexanoate, di-tert-butyl peroxyhexahydroterephthalate and di-tert-butyl peroxyazelate.

Vinyl-based resins and polyester resins similar to those used as the second resin can be used as vinyl resins and polyester resins used for forming a hybrid resin in which a vinyl resin and a polyester resin are bound to each other.

An example of a method for producing a hybrid resin in which a vinyl resin and a polyester resin are bound to each other is a method comprising polymerizing using a compound able to react with monomers that produce both resins (hereinafter referred to as a "bireactive compound").

Examples of the bireactive compound include compounds such as fumaric acid, acrylic acid, methacrylic acid, citraconic acid, maleic acid and dimethyl fumarate. Of these, fumaric acid, acrylic acid and methacrylic acid can be advantageously used.

In cases where a hybrid resin in which a vinyl resin and a polyester resin are bound to each other is used, the content of the vinyl resin in the hybrid resin is preferably at least 10 mass %, at least 20 mass %, at least 40 mass %, at least 60 mass % or at least 80 mass %, and is preferably not more than 100 mass % or not more than 90 mass %.

From the perspective of improving charging performance in high temperature high humidity environments, the acid value AVa of the second resin is preferably 50.0 mg KOH/g or less, and more preferably 30.0 mg KOH/g or less. The lower limit thereof is not particularly limited, but is preferably at least 0 mg KOH/g and, from the perspective of improving charge rising performance, is preferably at least 0.5 mg KOH/g, and more preferably at least 1.0 mg KOH/g.

In observations of cross sections of 100 toner particles using a transmission electron microscope, an area ratio B (area %) denotes a ratio of an area occupied by the second resin in cross sections of the toner particles. When Y denotes the number of cross sections of toner particles for which the area ratio B is 90 area % or more, the value of Y/Z is preferably 0.10 or more, and more preferably 0.14 or more. The upper limit for the value of Y/Z is not particularly limited, but is preferably 0.25 or less, and more preferably 0.20 or less. If the value of Y/Z is 0.10 or more, toner particles in which the proportion of the amorphous resin that is the second resin is high act as a filler in an image, as a result, a strength of the image is improved, and image durability is therefore further improved. In addition, the average value of the area ratio B is preferably 25 to 70 area %, and more preferably 27 to 62 area %.

The following method can be given as an example of a method for producing a toner in which the area ratio B falls within the range mentioned above. A toner particle group (referred to as toner particle group 1) in which the average value of the area ratio A falls within the range 30 to 75 area % is produced by controlling the proportions of the crystalline resin and the amorphous resin. Separately, another toner particle group (referred to as toner particle group 2) that contains toner particles for which the area ratio A is 90 area % or more is also produced. Furthermore, another toner particle group (referred to as toner particle group 3) that contains toner particles for which the area ratio B is 90 area % or more is produced. Toner particle groups 1 to 3 are then mixed so as to achieve the ranges mentioned above.

For the purpose of improving pigment dispersibility, the binder resin may include a third resin other than the first resin and the second resin to the extent that the effect of the present disclosure is not impaired. Examples of such resin include the following. Polyvinyl chloride, phenol resin, natural resin-modified phenol resin, natural resin-modified maleic acid resin, polyvinyl acetate, silicone resin, polyester resin, polyurethane resin, polyamide resin, furan resin, epoxy resin, xylene resin, polyvinyl butyral, terpene resin, coumarone-indene resin, and petroleum resin.

Toner particles may comprise a wax. Examples of the wax include the following: hydrocarbon waxes such as microcrystalline wax, paraffin wax and Fischer-Tropsch wax; oxides of hydrocarbon waxes, such as polyethylene oxide wax, and block copolymers of these; waxes such as carnauba wax consisting primarily of fatty acid esters; and waxes such as deoxidized carnauba wax consisting of partially or fully deoxidized fatty acid esters.

Other examples include the following: saturated straight-chain fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, ceryl alcohol and melissyl alcohol; polyhydric alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, ceryl alcohol and melissyl alcohol; fatty acid amides such as linoleamide, oleamide and lauramide; saturated fatty acid bisamides such as methylene bis stearamide, ethylene bis capramide, ethylene bis lauramide and hexamethylene bis stearamide; unsaturated fatty acid amides such as ethylene bis oleamide, hexamethylene bis oleamide, N,N'-dieoleyl adipamide and N,N'-dioleyl sebacamide; aromatic bisamides such as m-xylene bis stearamide and N,N'-distearyl isophthalamide; aliphatic metal salts (commonly called metal soaps) such as calcium stearate, calcium laurate, zinc stearate and magnesium stearate; waxes obtained by grafting vinyl monomers such as styrene and acrylic acid onto aliphatic hydrocarbon waxes; partial esterification products of polyhydric alcohols and fatty acids, such as behenic acid monoglyceride; and methyl ester compounds having hydroxy groups obtained by hydrogenation of plant-based oils and fats.

The wax content is preferably from 2.0 parts by mass to 30.0 parts by mass with respect to 100 parts by mass of the binder resin.

The toner particle may also comprise a colorant. Examples of colorants include the following.

Examples of black colorants include carbon black and blacks obtained by blending yellow, magenta and cyan colorants. A pigment may be used alone as a colorant, but combining a dye and a pigment to improve the sharpness is desirable from the standpoint of the image quality of full-color images.

Examples of pigments for magenta toners include C.I. pigment red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. pigment violet 19; and C.I. vat red 1, 2, 10, 13, 15, 23, 29 and 35.

Examples of dyes for magenta toners include C.I. solvent red 1, 3, 8, 23, 24, 25, 27, 30, 49, 81, 82, 83, 84, 100, 109 and 121; C.I. disper red 9; C.I. solvent violet 8, 13, 14, 21, 27; oil-soluble dyes such as C.I. disperse violet 1, and C.I. basic red 1, 2, 9, 12, 13, 14, 15, 17, 18, 22, 23, 24, 27, 29, 32, 34, 35, 36, 37, 38, 39 and 40; and basic dyes such as C.I. basic violet 1, 3, 7, 10, 14, 15, 21, 25, 26, 27 and 28.

Examples of pigments for cyan toners include C.I. pigment blue 2, 3, 15:2, 15:3, 15:4, 16, and 17; C. I. vat blue 6; and C.I. acid blue 45 and copper phthalocyanine pigments having 1 to 5 phthalimidomethyl substituents in the phthalocyanine framework. Examples of dyes for cyan toners include C.I. solvent blue 70.

Examples of pigments for yellow toners include C.I. pigment yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. vat yellow 1, 3 and 20. Examples of dyes for yellow toners include C.I. solvent yellow 162. The content of the colorant is preferably from 0.1 part by mass to 30.0 parts by mass with respect to 100 parts by mass of the binder resin.

If necessary, the toner particle may include a charge control agent. As the charge control agent, known ones can be used, but a metal compound of an aromatic carboxylic acid, which is colorless, has a high charging speed of the toner, and can stably maintain a constant charge quantity, is particularly preferable.

Examples of negative charge control agents include metal compounds of salicylic acid, metal compounds of naphthoic acid, metal compounds of dicarboxylic acids, polymer compounds having a sulfonic acid or a carboxylic acid in a side chain, polymer compounds having a sulfonic acid salt or a sulfonic acid esterification product in a side chain, polymer compounds having a carboxylic acid salt or a carboxylic acid esterification product in a side chain, boron compounds, urea compounds, silicon compounds, and calixarenes.

The charge control agent may be added internally or externally to the toner particle. The content of the charge control agent is preferably from 0.2 parts by mass to 10.0 parts by mass.

The toner may contain an external additive. For example, a toner may be obtained by externally adding the external additive to the toner particle. Inorganic fine particles such as silica fine particles, titanium oxide fine particles and aluminum oxide fine particles are preferred as the external additive. Inorganic fine particles having a specific surface area of 50 to 400 $m^2/g$ are preferred as an external additive for improving flowability, and inorganic fine particles having a specific surface area of 10 to 50 $m^2/g$ are preferred in order to achieve durability.

In order to improve both improved flowability and durability, it is possible to use a combination of types of inorganic fine particles whose specific surface areas fall within the ranges mentioned above. The content of the external additive is preferably 0.1 parts by mass to 10.0 parts by mass relative to 100 parts by mass of the toner particle. When mixing the toner particle with the external additive, a publicly known mixer such as a Henschel mixer can be used.

The toner can also be used as a single component developer, but from the perspective of providing stable images over a long period of time, it is preferable for the toner to be used as a two component developer that is mixed with a magnetic carrier in order to further improve dot reproducibility. That is, a two component developer containing a toner and a magnetic carrier is preferred, with the toner being the toner mentioned above.

The magnetic carrier can be an ordinary publicly known carrier, such as an iron powder or a surface-oxidized iron powder; particles of a metal such as iron, lithium, calcium, magnesium, nickel, copper, zinc, cobalt, manganese, chromium or a rare earth element, or particles of alloys or oxides of these metals; a magnetic material such as ferrite; or a magnetic material-dispersed resin carrier (a so-called resin carrier) that contains a magnetic material and a binder resin that holds the magnetic material in a dispersed state. In cases where the toner is used as a two component developer that is mixed with a magnetic carrier, the content of the toner in the two component developer is preferably 2 to 15 mass %, and more preferably 4 to 13 mass %.

The method for producing the toner particle is not particularly limited, and it is possible to use a conventional publicly known production method, such as a suspension polymerization method, an emulsion aggregation method, a melt kneading method or a dissolution suspension method. Explanations will now be given using melt kneading methods as examples, but the method for producing the toner particle is not limited to these.

Firstly, in a raw material mixing step, prescribed amounts of the first resin and the second resin or a binder resin that contains the first resin and the second resin and, if necessary, other components such as waxes, colorants and charge control agents, are weighed out as materials that constitute the toner particle, blended and mixed. Examples of the mixing device include a double cone mixer, a V type mixer, a drum type mixer, a supermixer, a Henschel mixer, a Nauta mixer and a Mechano Hybrid (produced by Nippon Coke and Engineering Co., Ltd.).

Next, the mixed materials are melt kneaded so as to disperse the other components in the binder resin containing the first resin and the second resin. In a melt kneading step, a batch type kneader, such as a pressurizing kneader or Banbury mixer, or a continuous type kneader can be used, and single screw and twin screw extruders have become mainstream from the perspective of enabling continuous production. Examples thereof include KTK type twin screw extruders (produced by Kobe Steel Ltd.), TEM type twin screw extruders (produced by Toshiba Machine Co., Ltd.), PCM kneaders (produced by Ikegai Corp.), twin screw extruders (produced by KCK), co-kneaders (produced by Buss) and Kneadex (produced by Nippon Coke & Engineering Co., Ltd.). Furthermore, a resin composition obtained by melt kneading is rolled using a 2-roll roller or the like, and may be cooled by means of water or the like in a cooling step.

The dispersed state of the first resin and the second resin, the number average diameter of the domains, and the like, can be controlled by adjusting the kneading temperature in the melt kneading step, the screw rotational speed, and the like.

Then, the cooled product of the resin composition is pulverized to a desired particle diameter in the pulverization step. In the pulverization step, after coarse pulverization with a pulverizer such as a crusher, a hammer mill, or a feather mill, further, fine pulverization is performed with, for example, a Cryptron system (manufactured by Kawasaki Heavy Industries, Ltd.), a SuperRotor (manufactured by Nisshin Engineering Co., Ltd.), a turbo mill (manufactured by Turbo Industries Co., Ltd.) or an air jet system.

After that, a toner particle may be obtained, if necessary, by classification performed with a classifier or sieve such as inertial classification type Elbow Jet (manufactured by Nittetsu Mining Co., Ltd.), centrifugal force classification type Turboplex (manufactured by Hosokawa Micron Corporation), TSP separator (manufactured by Hosokawa Micron Corporation), Faculty (manufactured by Hosokawa Micron Corporation), and the like.

In addition, an explanation will now be given of a case in which the toner particle is produced using an emulsification aggregation method. In an emulsion aggregation method, a toner is produced by carrying out a dispersion step for producing fine particle-dispersed solutions comprising constituent materials of the toner; an aggregation step for aggregating fine particles comprising the constituent materials of the toner so as to control the particle diameter until the particle diameter of the toner is reached; a fusion step for subjecting the resin contained in the obtained aggregated particles to melt adhesion; a cooling step thereafter; a metal removal step for filtering the obtained toner and removing excess polyvalent metal ions; a filtering/washing step for filtering the obtained toner and washing with ion exchanged water or the like; and a step for removing water from the washed toner and drying.

Step for Preparing Resin Fine Particle-Dispersed Solution (Dispersion Step)

A resin fine particle-dispersed solution can be prepared using a publicly known method, but is not limited to such methods. Examples of publicly known methods include an emulsion polymerization method, a self-emulsification method, a phase inversion emulsification method in which an aqueous medium is added to a resin solution dissolved in an organic solvent so as to emulsify the resin, or a forcible emulsification method in which a resin is subjected to a high temperature treatment in an aqueous medium without using an organic solvent so as to forcibly emulsify the resin.

Specifically, the binder resin such as the first resin and the second resin are dissolved in organic solvents in which these resins dissolve, and a surfactant or a basic compound is added if necessary. In such cases, if the binder resin is a crystalline resin having a melting point, the resin may be dissolved after being heated to at least the melting point thereof. Next, resin fine particles are precipitated by slowly adding an aqueous medium while agitating by means of a homogenizer or the like. A resin fine particle-dispersed aqueous solution is then prepared by heating or lowering the pressure so as to remove the solvent.

Any solvent able to dissolve the resins mentioned above can be used as the organic solvent used for dissolving the resin, but use of an organic solvent that forms a uniform phase with water, such as toluene, is preferred from the perspective of suppressing the generation of coarse particles.

The type of surfactant is not particularly limited, but examples thereof include anionic surfactants such as sulfate ester salts, sulfonic acid salts, carboxylic acid salts, phosphate esters and soaps; cationic surfactants such as amine salts and quaternary ammonium salts; and non-ionic surfactants such as polyethylene glycol types, adducts of ethylene oxide to alkylphenols, and polyhydric alcohol types. It is possible to use one of these surfactants in isolation, or a combination of two or more types thereof.

Examples of the basic compound include inorganic bases such as sodium hydroxide and potassium hydroxide, and organic bases such as ammonia, triethylamine, trimethylamine, dimethylaminoethanol and diethylaminoethanol. It is possible to use one of these basic compounds in isolation, or a combination of two or more types thereof.

In addition, the 50% particle diameter on a volume basis (D50) of the resin fine particles in the resin fine particle-dispersed aqueous solution is preferably 0.05 to 1.00 μm, and more preferably 0.05 to 0.40 μm. By adjusting the 50% particle diameter on a volume basis (D50) within the range mentioned above, it is easy to obtain a toner particle having a diameter 3 to 10 μm, which is a suitable weight average particle diameter for the toner particle. Moreover, a dynamic light scattering particle size distribution analyzer (Nanotrac UPA-EX150 produced by Nikkiso Co., Ltd.) can be used to measure the 50% particle diameter on a volume basis (D50).

Preparation of Colorant Fine Particle-Dispersed Solution

A colorant fine particle-dispersed solution, which is used according to need, can be prepared using a publicly known method given below, but is not limited to such methods. The colorant fine particle-dispersed solution can be prepared by mixing a colorant, an aqueous medium and a dispersing agent using a publicly known mixing machine such as a stirring machine, an emulsifying machine or a dispersing machine. It is possible to use a publicly known dispersing agent such as a surfactant or a polymer dispersing agent as the dispersing agent used in this case. Whether the dispersing agent is a surfactant or a polymer dispersing agent, the dispersing agent can be removed by means of the washing step described below, but a surfactant is preferred from the perspective of washing efficiency.

Examples of the surfactant include anionic surfactants such as sulfate ester salts, sulfonic acid salts, phosphate esters and soaps; cationic surfactants such as amine salts and quaternary ammonium salts; and non-ionic surfactants such as polyethylene glycol type surfactants, adducts of ethylene oxide to alkylphenols, and polyhydric alcohol type surfactants.

Of these, non-ionic surfactants and anionic surfactants are preferred. In addition, it is possible to use a combination of a non-ionic surfactant and an anionic surfactant. It is possible to use one of these surfactants in isolation, or a combination of two or more types thereof. The concentration of the surfactant in the aqueous medium is preferably 0.5 to 5 mass %. The content of colorant fine particles in the colorant fine particle-dispersed solution is not particularly limited, but is preferably 1 to 30 mass % relative to the total mass of the colorant fine particle-dispersed solution.

In addition, the dispersed particle diameter of colorant fine particles in the colorant fine particle-dispersed aqueous solution is preferably such that the 50% particle diameter on a volume basis (D50) is 0.50 μm or less from the perspective of dispersibility of the colorant in the ultimately obtained toner particle. For similar reasons, the 90% particle diameter on a volume basis (D90) is preferably 2 μm or less. Moreover, the 50% particle diameter on a volume basis (D50) of the colorant fine particles dispersed in the aqueous medium can be measured using a dynamic light scattering particle size distribution analyzer (Nanotrac UPA-EX150 produced by Nikkiso Co., Ltd.).

Examples of publicly known mixing machines such as stirring machines, emulsifying machines and dispersing machines used when dispersing the colorant in the aqueous medium include ultrasonic homogenizers, jet mills, pressurized homogenizers, colloid mills, ball mills, sand mills and paint shakers. It is possible to use one of these mixing machines in isolation, or a combination thereof Preparation of Wax Fine Particle-Dispersed Solution A wax fine particle-dispersed solution may be used if necessary. A wax fine particle-dispersed solution can be prepared using the publicly known method given below, but is not limited to this publicly known method. The wax fine particle-dispersed solution can be prepared by adding a wax to an aqueous medium comprising a surfactant, heating to a temperature that is not lower than the melting point of the wax, dispersing in a particulate state using a homogenizer having a strong shearing capacity (for example, a “Clearmix W-Motion” produced by M Technique Co., Ltd.) or a pressure discharge type dispersing machine (for example, a “Gaulin homogenizer” produced by Gaulin), and then cooling to a temperature that is lower than the melting point of the wax.

In addition, the dispersed particle diameter of the wax fine particles in the wax fine particle-dispersed solution is such that the 50% particle diameter on a volume basis (D50) is preferably 0.03 to 1.0 μm, and more preferably 0.10 to 0.50 μm. In addition, it is preferable for coarse wax particles having diameters of at least 1 μm not to be present.

If the dispersed particle diameter in the wax fine particle-dispersed solution falls within the range mentioned above, the wax can be finely dispersed in the toner particle, an outmigration effect can be exhibited to the maximum possible extent at the time of fixing, and favorable separation properties can be achieved. Moreover, the 50% particle diameter on a volume basis (D50) of the wax fine particle-dispersed solution dispersed in the aqueous medium can be measured using a dynamic light scattering particle size distribution analyzer (Nanotrac UPA-EX150 produced by Nikkiso Co., Ltd.).

Mixing Step

In the mixing step, a mixed liquid is prepared by mixing the first resin fine particle-dispersed solution, the second resin fine particle-dispersed solution and, if necessary, the wax fine particle-dispersed solution, the colorant fine particle-dispersed solution, and the like. A publicly known mixing apparatus, such as a homogenizer or a mixer, can be used.

Step for Forming Aggregate Particles (Aggregation Step)

In the aggregation step, fine particles contained in the mixed solution prepared in the mixing step are aggregated so as to form aggregates having the target particle diameter. Here, by adding and mixing a flocculant according to need and applying heat and/or a mechanical force as appropriate, aggregates are formed through aggregation of resin fine particles and, if necessary, wax fine particles, colorant fine particles, and the like. If necessary, a flocculant that contains a divalent or higher metal ion may be used as the flocculant.

A flocculant that comprises a divalent or higher metal ion exhibits high cohesive strength and can achieve the desired objective even when added in a small amount. These flocculants can ionically neutralize ionic surfactants contained in the resin fine particle-dispersed solution, the wax fine particle-dispersed solution and the colorant fine particle-dispersed solution. As a result of a salting out and ion crosslinking effect, resin fine particles, wax fine particles and colorant fine particles are easily aggregated.

The aggregation step is a step in which toner particle-sized aggregates are formed in the aqueous medium. The weight average particle diameter of aggregates produced in the aggregation step is preferably 3 to 10 μm. Moreover, this weight average particle diameter can be measured using a particle size distribution analyzer that uses the Coulter principle (Coulter Multisizer III: produced by Beckman Coulter, Inc.).

Fusion Step

In the fusion step, an aggregation-stopping agent may be added to a dispersed solution containing the aggregates obtained in the aggregation step while agitating in the same way as in the aggregation step. Examples of aggregation-stopping agents include basic compounds which shift the equilibrium of acidic polar groups in the surfactant to the dissociation side and stabilize aggregated particles. Other examples include chelating agents, which partially dissociate ionic crosslinks between acidic polar groups in the surfactant and metal ions which are the flocculant and form coordination bonds with the metal ions, thereby stabilizing aggregated particles.

After the dispersed state of aggregated particles in the dispersed solution has stabilized as a result of the action of the aggregation-stopping agent, the aggregated particles can be fused by being heated to a temperature that is not lower than the glass transition temperature or melting point of the binder resin. The number average diameter of the domains can be controlled by adjusting the temperature in the fusion step. The weight average particle diameter of the obtained toner particles is preferably 3 to 10 μm.

Filtration Step, Washing Step, Drying Step and Classification Step

Next, toner particles can be obtained by subjecting toner particle solids to a filtration step and, if necessary, a washing step, a drying step and a classification step for adjusting particle size. Obtained toner particles may be used as-is as a toner. A toner may be obtained by mixing obtained toner particles with inorganic fine particles and, if necessary, other external additives. The toner particles, inorganic fine particles and other external additives can be mixed using a mixing device such as a double cone mixer, a V type mixer, a drum type mixer, a supermixer, a Henschel mixer, a Nauta mixer, a Mechano Hybrid (produced by Nippon Coke and Engineering Co., Ltd.) or a Nobilta (produced by Hosokawa Micron Corp.).

Explanations will now be given of methods for measuring a variety of physical properties of the toner and raw materials.

Toner Cross Section Observations

Sections are first prepared as reference samples of abundance. The first resin (crystalline resin) is first thoroughly dispersed in a visible light curable resin (Aronix LCR Series D800) and cured by exposure to short wavelength light. The resulting cured resin is cut with an ultramicrotome equipped with a diamond knife to prepare a 250 nm sample section. A sample of the second resin (amorphous resin) is prepared in the same way.

The first resin and second resin are mixed at ratios of 30/70 and 70/30, and melt kneaded to prepare kneaded mixtures. These are similarly dispersed in visible light curable resin and cut to prepare sample sections.

Next, these reference samples are observed in cross-section by TEM-EDX using a transmission electron microscope (JEOL Ltd., JEM-2800 electron microscope), and element mapping is performed by EDX. The mapped elements are carbon, oxygen and nitrogen. The mapping conditions are as follows.

Acceleration voltage: 200 kV

Electron beam exposure size: 1.5 nm

Live time limit: 600 sec

Dead time: 20 to 30

Mapping resolution: 256×256

(Oxygen element intensity/carbon element intensity) and (nitrogen element intensity/carbon element intensity) are calculated based on the spectral intensities of each element (average in 10 nm-square area), and calibration curves are prepared for the mass ratios of the first and second resin. When the monomer units of the first resin contain nitrogen, the subsequent assay is performed using the (nitrogen element intensity/carbon element intensity) calibration curve.

The toner samples are then analyzed. The toner is first thoroughly dispersed in a visible light curable resin (Aronix LCR Series D800) and cured by exposure to short wavelength light. The resulting cured resin is cut with an ultramicrotome equipped with a diamond knife to prepare a 250 nm sample section. The cut sample is then observed by TEM-EDX using a transmission electron microscope (JEOL Ltd., JEM-2800 electron microscope). A cross-sectional image of the toner particle is obtained, and element mapping is performed by EDX. The mapped elements are carbon, oxygen and nitrogen.

Moreover, the cross section of toner particle to be observed is selected in the manner described below. First, the cross section area of toner particle is determined from image of cross section of the toner particle, and the diameter (circle-equivalent diameter) of a circle having the same area as this cross section area is determined. Observations are carried out about only image of cross section of toner particle in which the absolute value of the difference between this circle-equivalent diameter and the weight average particle diameter (D4) of the toner is within 1.0 μm.

For an observed image, cross sections of toner particle are divided into areas measuring 10 nm on each side. For each area, the values of (oxygen element intensity/carbon element intensity) and/or (nitrogen element intensity/carbon element intensity) are calculated based on the spectral intensity of the elements (average values for a 10 nm square area), and the first resin and the second resin are distinguished from each other by being compared with the calibration curves mentioned above. In a case where the first resin or the second resin is contained at an amount of 80 mass % or more, it is assumed that this area measuring 10 nm on each side is occupied by the first resin or the second resin. 100 cross sections of toner particles are observed, and the area ratio A, the area ratio B and the values of X/Z and Y/Z are calculated on the basis of analysis results of these areas. For the area ratios A and B, the arithmetic mean value of 100 cross sections is used. Moreover, binarization and area ratio calculation are performed using Image Pro PLUS (produced by Nippon Roper Kabushiki Kaisha).

Confirmation of Matrix-Domain Structure

Observations of cross section of toner particle are carried out in the manner described above. Among the cross sections of 100 observed toner particles, the structure is confirmed for those cross sections of toner particle in which the area ratio A is 30 to 70 area %. Among cross sections of toner particle in which the area ratio A is 30 to 70 area %, in cases where the proportion of cross sections of toner particle in which a matrix-domain structure is formed is 80% or more by number, it is assessed the toner particle cross section of the measured toner has a matrix-domain structure.

Moreover, a state in which domains which are discontinuous phases are dispersed in a matrix that is a continuous phase is taken to be a matrix-domain structure. Here, it is assessed that in a case where 90 area % or more of the area occupied by the first resin or the area occupied by the second resin in a toner particle cross section is present as a single continuous region, the first resin or the second resin is taken to be a continuous phase. In addition, the long axis of a domain is measured, and the number average diameter of all cross sections present in observed cross sections of toner particle is calculated.

<Method for Separating Materials from Toner>

Each of the materials contained in the toner can be separated from the toner using the differences among the materials in solubility in solvents.

First separation: The toner is dissolved in 23° C. methyl ethyl ketone (MEK), and the soluble component (second resin) is separated from the insoluble components (first resin, wax, colorant, inorganic fine particle, etc.).

Second separation: The insoluble components obtained in the first separation (first resin, wax, colorant, inorganic fine particle, etc.) are dissolved in 100° C. MEK, and the soluble components (first resin, wax) are separated from the insoluble components (colorant, inorganic fine particle, etc.).

Third separation: The soluble components (first resin, wax) obtained in the second separation are dissolved in 23° C. chloroform and separated into a soluble component (first resin) and an insoluble component (wax).

Methods for Identifying and Measuring Content of Monomer Units Constituting First and Second Resins Methods for identifying and measuring the content of the monomer units that constitute the first and second resins are carried out by $^1$H-NMR under the conditions described below.

Measurement apparatus: FT NMR apparatus (JNM-EX400 produced by JEOL Ltd.)

Measurement frequency: 400 MHz

Pulse conditions: 5.0 μs

Frequency range: 10,500 Hz

Number of accumulations: 64

Measurement temperature: 30° C.

Sample: 50 mg of a measurement sample is placed in a sample tube having an internal diameter of 5 mm, deuterated chloroform ($CDCl_3$) is added as a solvent, and the measurement sample is dissolved in a constant temperature bath at 40° C.

From among peaks attributable to constituent elements of the first monomer unit in an obtained $^1$H-NMR chart, a peak that is independent from peaks attributable to constituent elements of other monomer units is selected, and the integrated value $S_1$ of this peak is calculated. Similarly, in a case where the resin has the second monomer unit, among peaks attributable to constituent elements of the second monomer unit, a peak that is independent from peaks attributable to constituent elements of other monomer units is selected, and the integrated value $S_2$ of this peak is calculated. An integrated value $S_x$ is calculated in the same way in a case where a resin also has an x-th monomer unit such as a third monomer unit.

The content of the first monomer unit is calculated in the manner described below using these integrated values. Moreover, $n_1$, $n_2$ and $n_x$ denote the number of hydrogens in constituent elements attributable to peaks observed for the respective segments.

$$\text{Content of first monomer unit (mol \%)}=\{(S_1/n_1)/((S_1/n_1)+(S_2/n_2)\ldots+(S_x/n_x))\}\times 100$$

Similarly, the content of the second monomer unit is determined in the manner shown below.

$$\text{Content of second monomer unit (mol \%)}=\{(S_2/n_2)/((S_1/n_1)+(S_2/n_2)\ldots+(S_x/n_x))\}\times 100$$

For example, in cases where a polymerizable monomer in which a hydrogen atom is not contained in constituent elements other than vinyl groups is used in the first and second resins, $^{13}C$-NMR measurements are carried out in single pulse mode using $^{13}C$ as a measurement atomic nucleus, and calculations are carried out in the same way as in $^{1}H$-NMR measurements. Mol % can be converted to mass % using the molecular weights of monomer units.

<Method for Measuring Weight Average Molecular Weight (Mw) of Resin or the Like Using Gel Permeation Chromatography (GPC)>

The weight average molecular weight (Mw) of a tetrahydrofuran (THF) soluble component such as a resin is measured by gel permeation chromatography (GPC) as follows.

First, the sample such as resin is dissolved in tetrahydrofuran (THF) over the course of 24 hours at room temperature. The resulting solution is filtered through a solvent-resistant membrane filter (Maishori Disk, Tosoh Corp.) having a pore diameter of 0.2 μm to obtain a sample solution. The concentration of THF-soluble components in the sample solution is adjusted to about 0.8 mass %. Measurement is performed under the following conditions using this sample solution.

System: HLC8120 GPC (detector: RI) (Tosoh Corp.)
Columns: Shodex KF-801, 802, 803, 804, 805, 806, 807 (total 7) (Showa Denko)
Eluent: Tetrahydrofuran (THF)
Flow rate: 1.0 mL/min
Oven temperature: 40.0° C.
Sample injection volume: 0.10 mL A molecular weight calibration curve prepared using standard polystyrene resin (product name: TSK standard polystyrene F-850, F-450, F-288, F-128, F-80, F-40, F-20, F-10, F-4, F-2, F-1, A-5000, A-2500, A-1000, A-500, Tosoh Corp.) is used for calculating the molecular weights of the samples.

Methods for Measuring Melting Point, Endothermic Peak and Endothermic Amount of Toner, Resin, and the Like The melting point of a toner, resin, or the like, and endothermic peaks and endothermic amounts are measured using a DSC Q1000 (produced by TA Instruments) under the following conditions.

Temperature increase rate: 10° C./min
Measurement start temperature: 20° C.
Measurement end temperature: 180° C.

Temperature calibration of the detector in the apparatus is performed using the melting points of indium and zinc, and heat amount calibration is performed using the heat of fusion of indium. Specifically, approximately 5 mg of a sample is weighed out, placed in an aluminum pan, and subjected to differential scanning calorimetric measurements. An empty silver pan is used as a reference. The melting point is taken to be the peak temperature of the maximum endothermic peak in a first temperature increase step. Moreover, in cases where there are multiple peaks, the maximum endothermic peak is taken to be the peak for which the endothermic amount is greatest. Furthermore, the endothermic amount of this maximum endothermic peak is determined. Peak attributions can be determined by carrying out DSC measurements on the unit materials separated from the toner mentioned above.

Method for Measuring Acid Value

Acid value is the number of milligrams of potassium hydroxide required to neutralize acid contained in 1 g of a sample. The acid value is measured in accordance with JIS K0070-1992, but is specifically measured using the following procedure.

(1) Reagent Preparation

A phenolphthalein solution is obtained by dissolving 1.0 g of phenolphthalein in 90 mL of ethyl alcohol (95 vol %) and adding ion exchanged water up to a volume of 100 mL. 7 g of special grade potassium hydroxide is dissolved in 5 mL of water, and ethyl alcohol (95 vol %) is added up to a volume of 1 L. A potassium hydroxide solution is obtained by placing the obtained solution in an alkali-resistant container so as not to be in contact with carbon dioxide gas or the like, allowing solution to stand for 3 days, and then filtering. The obtained potassium hydroxide solution is stored in the alkali-resistant container. The factor of the potassium hydroxide solution is determined by placing 25 mL of 0.1 mol/L hydrochloric acid in a conical flask, adding several drops of the phenolphthalein solution, titrating with the potassium hydroxide solution, and determining the factor from the amount of the potassium hydroxide solution required for neutralization. The 0.1 mol/L hydrochloric acid is produced in accordance with JIS-K8001-1998.

(2) Operation (A) Main Test 2.0 g of a pulverized sample is measured precisely into a 200 mL conical flask, 100 mL of a mixed toluene/ethanol (2:1) solution is added, and the sample is dissolved over a period of 5 hours. Next, several drops of the phenolphthalein solution are added as an indicator, and titration is carried out using the potassium hydroxide solution. Moreover, the end-point of the titration is deemed to be the point when the pale crimson color of the indicator is maintained for approximately 30 seconds.

(B) Blank Test

Titration is carried out in the same way as in the operation described above, except that the sample is not used (that is, only a mixed toluene/ethanol (2:1) solution is used).

(3) The acid value is calculated by inputting the obtained results into the formula below.

$$A=[(C-B)\times f\times 5.61]/S$$

Here, A denotes the acid value (mg KOH/g), B denotes the added amount (mL) of the potassium hydroxide solution in the blank test, C denotes the added amount (mL) of the potassium hydroxide solution in the main test, f denotes the factor of the potassium hydroxide solution, and S denotes the mass (g) of the sample.

<Method for Measuring Softening Temperature (Tm) of Resin>

The softening temperature of the resin is measured using a constant load extrusion type capillary rheometer (Shimadzu Corporation, CFT-500D Flowtester flow characteristics evaluation device) in accordance with the attached manual. With this device, the temperature of a measurement sample packed in a cylinder is raised to melt the sample while a fixed load is applied to the measurement sample from above with a piston, the melted measurement sample is extruded through a die at the bottom of the cylinder, and a flow curve can then be obtained showing the relationship between the temperature and the descent of the piston during this process. The "melting temperature by ½ method" as described in the attached manual of the CFT-500D Flowtester flow characteristics evaluation device is given as the softening temperature.

The melting temperature by the ½ method is calculated as follows.

Half of the difference between the descent of the piston upon completion of outflow (outflow end point, given as "Smax") and the descent of piston at the beginning of outflow (minimum point, given as "Smin") is determined and given as X (X=(Smax−Smin)/2). The temperature in the flow curve at which the descent of the piston is the sum of X and Smin is the melting temperature by the ½ method.

For the measurement sample, about 1.0 g of resin is compression molded for about 60 seconds at about 10 MPa with a tablet molding compressor (such as NPa Systems Co., Ltd., NT-100H) in a 25° C. environment to obtain a cylindrical sample about 8 mm in diameter.

The specific operations for measurement are performed in accordance with the device manual.

The CFT-500D measurement conditions are as follows.

Test mode: Temperature increase method
Initial temperature: 50° C.
Achieved temperature: 200° C.
Measurement interval: 1.0° C.
Ramp rate: 4.0° C./min
Piston cross-sectional area: 1.000 $cm^2$
Test load (piston load): 10.0 $kgf/cm^2$ (0.9807 MPa)
Pre-heating time: 300 seconds
Die hole diameter: 1.0 mm
Die length: 1.0 mm <Method for Measuring Weight-Average Particle Diameter (D4) of Toner Particle>

Using a Multisizer (registered trademark) 3 Coulter Counter precise particle size distribution analyzer (Beckman Coulter, Inc.) based on the pore electrical resistance method and equipped with a 100 μm aperture tube, together with the accessory dedicated Beckman Coulter Multisizer 3 Version 3.51 software (Beckman Coulter, Inc.) for setting measurement conditions and analyzing measurement data, measurement is performed with 25000 effective measurement channels, and the measurement data are analyzed to calculate the weight-average particle diameter (D4) of the toner particle (or toner). The aqueous electrolyte solution used in measurement may be a solution of special grade sodium chloride dissolved in ion-exchanged water to a concentration of about 1 mass %, such as ISOTON II (Beckman Coulter, Inc.) for example. The dedicated software settings are performed as follows prior to measurement and analysis.

On the "Standard measurement method (SOM) changes" screen of the dedicated software, the total count number in control mode is set to 50000 particles, the number of measurements to 1, and the Kd value to a value obtained with "standard particles 10.0 μm" (Beckman Coulter, Inc.). The threshold noise level is set automatically by pushing the "Threshold/Noise Level measurement button". The current is set to 1600 μA, the gain to 2, and the electrolyte solution to ISOTON II, and a check is entered for aperture tube flush after measurement. On the "Conversion settings from pulse to particle diameter" screen of the dedicated software, the bin interval is set to the logarithmic particle diameter, the particle diameter bins to 256, and the particle diameter range to from 2 μm to 60 μm. The specific measurement methods are as follows.

(1) About 200 mL of the aqueous electrolyte solution is added to a dedicated 250 mL round-bottomed beaker of the Multisizer 3, the beaker is set on the sample stand, and stirring is performed with a stirrer rod counterclockwise at a rate of 24 rotations/second. Contamination and bubbles in the aperture tube are then removed by the "Aperture tube flush" function of the dedicated software.

(2) 30 mL of the same aqueous electrolyte solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries) diluted 3× by mass with ion-exchanged water is added.

(3) A specific amount of ion-exchanged water is placed in the water tank of an ultrasonic disperser (Ultrasonic Dispersion System Tetora 150, Nikkaki Bios) with an electrical output of 120 W equipped with two built-in oscillators having an oscillating frequency of 50 kHz with their phases shifted by 180° from each other, and about 2 mL of the Contaminon N is added to this water tank.

(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolyte solution in the beaker.

(5) The aqueous electrolyte solution in the beaker of (4) is exposed to ultrasound as about 10 mg of toner (particle) is added bit by bit to the aqueous electrolyte solution, and dispersed. Ultrasound dispersion is then continued for a further 60 seconds. During ultrasound dispersion, the water temperature in the tank is adjusted appropriately to from 10° C. to 40° C.

(6) The aqueous electrolyte solution of (5) with the toner (particle) dispersed therein is dripped with a pipette into the round-bottomed beaker of (1) set on the sample stand, and adjusted to a measurement concentration of about 5%. Measurement is then performed until the number of measured particles reaches 50000.

(7) The measurement data is analyzed with the dedicated software attached to the apparatus, and the weight-average particle diameter (D4) is calculated. The weight-average particle diameter (D4) is the "Average diameter" on the "Analysis/volume statistical value (arithmetic mean)" screen when Graph/vol % is set in the dedicated software.

Method for Measuring 50% Particle Diameter on a Volume Basis (D50) of Resin Fine Particles, Wax Fine Particles and Colorant Fine Particles A dynamic light scattering particle size distribution analyzer (Nanotrac UPA-EX150 produced by Nikkiso Co., Ltd.) is used to measure the 50% particle diameter on a volume basis (D50) of the fine particles. Specifically, measurements are carried out using the following procedure. In order to prevent aggregation of the measurement sample, a dispersed solution obtained by dispersing the measurement sample in an aqueous solution containing Family Fresh (produced by Kao Corporation) is introduced and agitated. Following the agitation, the measurement sample is introduced into the apparatus, after which measurements are carried out twice and the average value is determined.

In terms of measurement conditions, the measurement time is 30 seconds, the refractive index of sample particles is 1.49, the dispersion medium is water, and the refractive index of the dispersion medium is 1.33. The volume-based particle size distribution of the measurement sample is measured, and from the measurement results, the particle diameter at which the cumulative value from the small particle diameter side reaches 50% in the volume-based particle size distribution is taken to be the 50% particle diameter on a volume basis (D50) of the fine particles.

WORKING EXAMPLES

The present disclosure will now be explained in greater detail using the working examples given below. However, these working examples in no way limit the present disclosure. In the formulations below, "parts" always means parts by mass unless explicitly indicated otherwise.

Production Example of First Resin 1 (Crystalline Resin 1)

Solvent: toluene: 100.0 parts

Monomer composition: 100.0 parts (The monomer composition is obtained by mixing behenyl acrylate, acrylic acid and styrene at the proportions shown below)

(Behenyl acrylate: 40.0 parts)

(Acrylic acid: 1.0 parts)

(Styrene: 59.0 parts)

Polymerization initiator: 0.5 parts t-butyl peroxypivalate (Perbutyl PV, produced NOF Corp.)

The above materials were put into a reaction vessel equipped with a reflux condenser, a stirrer, a thermometer, and a nitrogen introduction tube under a nitrogen atmosphere. The inside of the reaction vessel was heated to 70° C. while stirring at 200 rpm, and a polymerization reaction was carried out for 12 hours to obtain a solution in which the polymer of the monomer composition was dissolved in toluene. Subsequently, after the temperature of the solution was lowered to 25° C., the solution was poured into 1000.0 parts of methanol while stirring to precipitate methanol insolubles. The obtained methanol insolubles were filtered off, further washed with methanol, and then vacuum dried at 40° C. for 24 h to obtain the first resin 1 (crystalline resin 1).

Production Examples of First Resins 2 to 5 (Crystalline Resins 2 to 5)

First resins 2 to 12 (crystalline resins 2 to 12) were obtained by carrying out a similar reaction to that used in the production example of the first resin 1 (crystalline resin 1), except that the monomers and numbers of parts by mass were changed in the manner shown in Table 1-1 Physical properties are shown in Table 2

TABLE 1-1

| Crystalline | First polymerizable monomer | | Second polymerizable monomer | | Third polymerizable monomer | |
|---|---|---|---|---|---|---|
| resin | Type | Parts | Type | Parts | Type | Parts |
| 1 | BEA | 40.0 | AA | 1.0 | St | 59.0 |
| 2 | BEA | 70.0 | AA | 1.0 | St | 29.0 |
| 3 | BEA | 90.0 | AA | 1.0 | St | 9.0 |
| 4 | BEA | 25.0 | AA | 1.0 | St | 76.0 |
| 5 | ODA | 90.0 | AA | 1.0 | St | 76.0 |

Abbreviations used in the tables are as follows.

BEA: Behenyl acrylate

ODA: Octadecyl acrylate

AA: Acrylic acid

St: Styrene

Production Example of First Resin 6 (Crystalline Resin 6)

1,6-hexane diol: 33.9 parts (100.0 mol % relative to the total number of moles of polyhydric alcohol)

Dodecanedioic acid: 66.1 parts (100.0 mol % relative to the total number of moles of polycarboxylic acid)

Tin 2-ethylhexanoate: 0.5 parts

The materials listed above were weighed out into a reaction vessel equipped with a condenser tube, a stirrer, a nitrogen inlet tube and a thermocouple. The flask was purged with nitrogen gas, the temperature was gradually increased while stirring the contents of the flask, and a reaction was allowed to progress for 3 hours while stirring the contents of the flask at a temperature of 140° C. Next, the pressure inside the reaction vessel was lowered to 8.3 kPa, and a reaction was carried out for 4 hours while maintaining a temperature of 200° C. First resin 6 (crystalline resin 6) was then obtained by lowering the pressure inside the reaction vessel to 5 kPa or less and carrying out a reaction for 3 hours at 200° C.

Production Examples of First Resins 7 to 9 (Crystalline Resins 7 to 9)

First resins 7 to 9 were obtained by carrying out production in the same way as in the production example of first resin 6, except that the alcohol component and the carboxylic acid component were changed to the monomers shown in Table 1-2. Physical properties are shown in Table 2.

TABLE 1-2

| Crystalline | Alcohol component | | Carboxylic acid component | |
|---|---|---|---|---|
| resin | Type | mol % | Type | mol % |
| 6 | HO | 49.5 | DDA | 50.5 |
| 7 | HO | 49.5 | DA | 50.5 |
| 8 | BO | 49.5 | TDA | 50.5 |
| 9 | EG | 49.5 | DA | 50.5 |

Abbreviations used in the tables are as follows.

EG: Ethylene glycol

BO: Butane diol

HO: Hexane diol

DA: Decanedioic acid

DDA: Dodecanedioic acid

TDA: Tetradecanedioic acid

TABLE 2

| Crystalline resin | AVc [mgKOH/g] | $T_p$ [° C.] | Mw |
|---|---|---|---|
| 1 | 15 | 60 | 34000 |
| 2 | 17 | 60 | 40000 |
| 3 | 18 | 60 | 42000 |
| 4 | 14 | 60 | 30000 |
| 5 | 18 | 51 | 45000 |
| 6 | 40 | 75 | 28000 |
| 7 | 30 | 60 | 20000 |
| 8 | 50 | 58 | 24000 |
| 9 | 35 | 55 | 30000 |

AVc denotes acid value and Tp denotes melting point.

Production Example of Second Resin 1 (Amorphous Resin 1)

In a nitrogen atmosphere, the materials listed below were placed in a reaction vessel equipped with a reflux condenser, a stirrer, a temperature gauge and a nitrogen inlet tube.

Polyoxypropylene(2.0)-2,2-bis(4-hydroxyphenyl)propane: 73.2 parts (0.25 moles; 100.0 mol % relative to the total number of moles of polyhydric alcohol)

Terephthalic acid: 25.1 parts (0.24 moles; 95.0 mol % relative to the total number of moles of polycarboxylic acid)

Titanium tetrabutoxide: 2.0 parts

Next, the flask was purged with nitrogen gas, the temperature was gradually increased while stirring the contents of the flask, and a reaction was allowed to progress for 2 hours while stirring the contents of the flask at a temperature of 200° C. and distilling off generated water. Next, the pressure inside the reaction vessel was lowered to 8.3 kPa and held at this pressure for 1 hour, after which the contents of the reaction vessel were cooled to a temperature of 180°

C. and the reaction vessel was allowed to return to atmospheric pressure (a first reaction step).

Trimellitic anhydride: 8.2 parts (0.02 moles; 5.0 mol % relative to the total number of moles of polycarboxylic acid)

Tert-butylcatechol (polymerization inhibitor): 0.1 parts

Next, the materials listed above were added, the pressure inside the reaction vessel was lowered to 8.3 kPa, a reaction was allowed to progress for 4 hours while maintaining a temperature of 150° C., and the temperature was lowered so as to terminate the reaction (second reaction step), thereby obtaining second resin 1. Physical properties are shown in Table 4.

Production Example of Second Resin 2 (Amorphous Resin 2)

In a nitrogen atmosphere, the materials listed below were placed in a reaction vessel equipped with a reflux condenser, a stirrer, a temperature gauge and a nitrogen inlet tube.

Polyoxyethylene(2.0)-2,2-bis(4-hydroxyphenyl)propane: 81.0 parts (0.20 moles; 50.0 mol % relative to the total number of moles of polyhydric alcohol)

Polyoxypropylene(2.0)-2,2-bis(4-hydroxyphenyl)propane: 115.0 parts (0.25 moles; 40.0 mol % relative to the total number of moles of polyhydric alcohol)

Ethylene glycol: 3.1 parts (0.05 moles; 10.0 mol % relative to the total number of moles of polyhydric alcohol)

Terephthalic acid: 49.8 parts (0.30 moles; 60.0 mol % relative to the total number of moles of polycarboxylic acid)

Adipic acid: 21.9 parts (0.15 moles; 30.0 mol % relative to the total number of moles of polycarboxylic acid)

Titanium tetrabutoxide: 2.5 parts

The materials listed above were weighed out and introduced into a reaction vessel equipped with a condenser tube, a stirrer, a nitrogen inlet tube and a thermocouple. Next, the flask was purged with nitrogen gas, the temperature was gradually increased while stirring the contents of the flask, and a reaction was allowed to progress for 2 hours while stirring the contents of the flask at a temperature of 230° C. and distilling off generated water. Next, a reaction was carried out for 1 hour at a reduced pressure of 8.3 kPa, after which the temperature was increased to 180° C. and the pressure was then allowed to return to atmospheric pressure (a first reaction step).

Trimellitic anhydride: 13.3 parts (0.05 moles; 10.0 mol % relative to the total number of moles of polycarboxylic acid)

Tert-butylcatechol (polymerization inhibitor): 1 part

Next, the materials listed above were added, the pressure inside the reaction vessel was lowered to 8.3 kPa, a reaction was allowed to progress for 4 hours while maintaining a temperature of 150° C., and the temperature was lowered so as to terminate the reaction (second reaction step), thereby obtaining amorphous resin 2.

Production Example of Second Resin 3 (Amorphous Resin 3)

50.0 parts of xylene was placed in an autoclave, which was then purged with nitrogen, after which the temperature of the autoclave was increased to 185° C. in a tightly sealed state under stirring. A mixed solution of 74.6 parts of styrene, 24.7 parts of n-butyl acrylate, 0.7 parts of acrylic acid, 1.0 part of di-tert-butyl peroxide and 20.0 parts of xylene was continuously added dropwise over a period of 3 hours and polymerized while controlling the temperature inside the autoclave to 190° C. The second resin 3 (amorphous resin 3) was obtained by maintaining this temperature for a further 1 hour to complete polymerization and remove the solvent.

Production Example of Second Resin 4 (Amorphous Resin 4)

In a nitrogen atmosphere, the materials listed below were placed in a reaction vessel equipped with a reflux condenser, a stirrer, a temperature gauge and a nitrogen inlet tube.

Polyoxyethylene(2.0)-2,2-bis(4-hydroxyphenyl)propane: 23.0 parts (0.05 moles; 10.0 mol % relative to the total number of moles of polyhydric alcohol)

Polyoxypropylene(2.0)-2,2-bis(4-hydroxyphenyl)propane: 182.0 parts (0.45 moles; 90.0 mol % relative to the total number of moles of polyhydric alcohol)

Terephthalic acid: 49.8 parts (0.30 moles; 60.0 mol % relative to the total number of moles of polycarboxylic acid)

Adipic acid: 21.9 parts (0.15 moles; 30.0 mol % relative to the total number of moles of polycarboxylic acid)

Titanium tetrabutoxide: 2.5 parts

The materials listed above were weighed out and introduced into a reaction vessel equipped with a condenser tube, a stirrer, a nitrogen inlet tube and a thermocouple. Next, the flask was purged with nitrogen gas, the temperature was gradually increased while stirring the contents of the flask, and a reaction was allowed to progress for 2 hours while stirring the contents of the flask at a temperature of 230° C. and distilling off generated water. Next, a reaction was carried out for 1 hour at a reduced pressure of 8.3 kPa, after which the temperature was increased to 180° C. and the pressure was then allowed to return to atmospheric pressure (a first reaction step).

Trimellitic anhydride: 13.3 parts (0.05 moles; 10.0 mol % relative to the total number of moles of polycarboxylic acid)

Tert-butylcatechol (polymerization inhibitor): 1 part

Next, the materials listed above were added, the pressure inside the reaction vessel was lowered to 8.3 kPa, a reaction was allowed to progress for 4 hours while maintaining a temperature of 150° C., and the temperature was lowered so as to terminate the reaction (second reaction step), thereby obtaining amorphous resin 4.

Production Example of Second Resin 5 (Amorphous Resin 5)

(Formulation of Polyester Resin 1)

Adduct of (2.2 moles of) ethylene oxide to bisphenol A: 50.0 parts by mole

Adduct of (2.2 moles of) propylene oxide to bisphenol A: 50.0 parts by mole

Terephthalic acid: 65.0 parts by mole

Trimellitic anhydride: 25.0 parts by mole

Acrylic acid: 10.0 parts by mole 90 parts of a mixture of monomers for producing polyester resin 1 was placed in a four-mouthed flask, a depressurization device, a water separation device, a nitrogen gas introduction device, a temperature measurement device and a stirring device were attached to the flask, and stirring was carried out at 160° C. in a nitrogen atmosphere. Next, 10 parts of vinyl polymerizable monomers for producing a vinyl resin (81.0 parts of styrene, 17.0 parts of n-butyl acrylate, 0.9 parts of acrylic acid and 1.1 parts of divinylbenzene) and 1 part of benzoyl peroxide as a polymerization initiator were added dropwise over a period of 4 hours from a dropping funnel, and a reaction was carried out for 5 hours at 160° C. The temperature was then increased to 230° C., titanium tetrabutoxide was added at an amount of 0.2 parts relative to the total amount of the monomers for producing the polyester resin, and polymerization was carried out until a softening point of 105° C. was reached. Following completion of the reaction, the second resin 5 (amorphous resin 5) was obtained by removing the polymer from the container, cooling and pulverizing. Physical properties are shown in Table 4.

Production Example of Second Resin 6 (Amorphous Resin 6)

Uniol DA-400 (produced by NOF Corp.): 60.8 parts
Dimethylolbutanoic acid: 2.5 parts
Diphenylmethane-4,4'-diisocyanate: 38.5 parts
Dioctyl tin dilaurate: 0.04 parts The monomers listed above were charged in a flask equipped with a stirrer, a nitrogen inlet tube, a temperature sensor and a rectifying column, and second resin 6, which is a polyurethane resin, was obtained by carrying out a reaction for 5 hours at 130° C. Physical properties are shown in Table 4.

TABLE 3

| Amorphous resin | AVa [mgKOH/g] | Tg [° C.] | Tm [° C.] | Mw |
|---|---|---|---|---|
| 1 | 10 | 50 | 90 | 30000 |
| 2 | 2 | 35 | 120 | 60000 |
| 3 | 5 | 52 | 95 | 42000 |
| 4 | 20 | 55 | 100 | 44000 |
| 5 | 15 | 55 | 105 | 35000 |
| 6 | 0 | 76 | 100 | 40000 |

AVa denotes acid value, Tg denotes glass transition temperature, and Tm denotes softening point.

Production Example of Toner Particle 1a

First resin 1: 50 parts
Second resin 1: 50 parts
Hydrocarbon wax 1 (Fischer Tropsch wax; peak temperature of maximum endothermic peak in DSC: 92° C.): 10.0 parts
Pigment (cyan pigment, Pigment Blue 15:3 produced by Dainichiseika Color and Chemicals Mfg. Co., Ltd.): 6.5 parts Using a Henschel mixer (an FM-75 model, produced by Nippon Coke and Engineering Co., Ltd.), the materials listed above were mixed at a rotational speed of 20 $s^{-1}$ for a period of 3 minutes, and then kneaded using a twin screw kneader set to a temperature of 120° C. (a PCM-30 model, produced by Ikegai Corporation) at a screw rotational speed of 250 rpm and a discharge temperature of 125° C. The obtained kneaded product was cooled and then coarsely pulverized to a size of not more than 1 mm using a hammer mill so as to obtain a coarsely pulverized product. The obtained coarsely pulverized product was then finely pulverized using a mechanical pulverizer (a T-250, produced by Freund Turbo Corporation). Toner particle 1a having a weight average particle diameter of approximately 6.0 μm was then obtained by classifying the finely pulverized product using a Faculty F-300 (produced by Hosokawa Micron Corp.). Operating conditions were such that the rotational speed of a classifying rotor was 130 $s^{-1}$ and the rotational speed of a dispersing rotor was 120 $s^{-1}$.

Production Examples of Toner Particle 1b and Toner Particle 1c

Toner particle 1b and toner particle 1c were obtained by carrying out production in the same way as in the production example of toner particle 1a, except that the number of parts of the first resin and second resin were changed as shown in Table 4.

Production Examples of Toner Particles 2a to 12a, 16a to 28a, 2b to 12b and 16b to 22b Toner particles 2a to 12a, 16a to 28a, 2b to 12b and 16b to 22b were obtained by carrying out production in the same way as in the production example of toner particle 1a, except that the types and number of parts of the first resin and second resin were changed as shown in Table 4.

Production Example of Toner Particle 13

Production Example of First Resin 6 Fine Particle-Dispersed Solution

Toluene (produced by Wako Pure Chemical Industries, Ltd.): 300 parts
First resin 6: 100 parts The materials listed above were weighed out, mixed and dissolved at 90° C. Separately, 5.0 parts of sodium dodecylbenzene sulfonate and 10.0 parts of sodium laurate were added to 700 parts of ion exchanged water, and dissolved by heating at 90° C. Next, the toluene solution and aqueous solution mentioned above were mixed together and stirred at 7000 rpm using a T.K. Robomix ultrahigh speed stirrer (produced by Primix Corporation). The obtained mixture was then emulsified at a pressure of 200 MPa using a Nanomizer high pressure impact disperser (produced by Yoshida Kikai Co., Ltd.). An aqueous dispersed solution containing fine particles of first resin 6 at a concentration of 20 mass % (first resin 6 fine particle-dispersed solution) was then obtained by removing the toluene using an evaporator and adjusting the concentration using ion exchanged water. The 50% particle diameter on a volume basis (D50) of the first resin 6 was measured using a dynamic light scattering particle size distribution analyzer (Nanotrac UPA-EX150 produced by Nikkiso Co., Ltd.), and found to be 0.40

Production Example of Second Resin 4 Fine Particle-Dispersed Solution

Tetrahydrofuran (produced by Wako Pure Chemical Industries, Ltd.): 300 parts
Second resin 4: 100 parts
Anionic surfactant (Neogen RK produced by Dai-ichi Kogyo Seiyaku Co., Ltd.): 0.5 parts The materials listed above were weighed out, mixed and dissolved. Next, 20.0 parts of 1 mol/L aqueous ammonia was added and stirred at 4000 rpm using a T.K. Robomix ultrahigh speed stirrer (produced by Primix Corporation). 700 parts of ion exchanged water was then added at a rate of 8 g/min so as to precipitate fine particles of second resin 4. An aqueous dispersed solution containing fine particles of second resin 4 at a concentration of 20 mass % (second resin 4 fine particle-dispersed solution) was then obtained by removing the tetrahydrofuran using an evaporator and adjusting the concentration by means of ion exchanged water. The 50% particle diameter on a volume basis (D50) of second resin 4 fine particles was 0.14

Production Example of Wax Fine Particle-Dispersed Solution

| | |
|---|---|
| Hydrocarbon wax 1 (Fischer-Tropsch wax; DSC: peak temperature of maximum endothermic peak 92° C.) | 100.0 parts |
| Anionic surfactant NEOGEN RK (manufactured by Dai-ichi Kogyo Seiyaku Co., Ltd.) | 5 parts |
| Ion-exchanged water | 395 parts |

The above materials were weighed, placed in a mixing container equipped with a stirrer, heated to 90° C., circulated to CLEAREMIX W-MOTION (manufactured by M-Technique Co., Ltd.), and subjected to dispersion treatment for 60 min. The conditions for the dispersion treatment were as follows.

Rotor outer diameter: 3 cm

Clearance: 0.3 mm

Rotor rotation speed: 19000 r/min

Screen rotation speed: 19000 r/min

After the dispersion treatment, cooling to 40° C. was performed under the cooling conditions of a rotor rotation speed of 1000 r/min, a screen rotation speed of 0 r/min, and a cooling speed of 10° C./min to obtain an aqueous dispersion liquid (wax fine particle dispersion liquid) having a concentration of wax fine particles of 20% by mass. The 50% particle diameter (D50) of the wax fine particles based on the volume distribution was measured using a dynamic light scattering type particle side distribution meter NANOTRACK UPA-EX150 (manufactured by Nikkiso Co., Ltd.) and found to be 0.15 μm.

<Production Example of Colorant Fine Particle Dispersion Liquid>

| | |
|---|---|
| Colorant 1<br>(Cyan pigment: Pigment Blue 15:3, manufactured by Dainichiseika Color & Chem MFG Co., Ltd.) | 50.0 parts |
| Anionic surfactant NEOGEN RK (manufactured by Dai-ichi Kogyo Seiyaku Co., Ltd.) | 7.5 parts |
| Ion-exchanged water | 442.5 parts |

The above materials were weighed, mixed, dissolved, and dispersed for about 1 h using a high-pressure impact disperser NANOMIZER (manufactured by Yoshida Kikai Co., Ltd.) to obtain an aqueous dispersion liquid (colorant fine particle dispersion liquid) in which the colorant was dispersed and which had a concentration of colorant fine particles of 10% by mass. The 50% particle diameter (D50) based on the volume distribution of the colorant fine particles was measured using a dynamic light scattering type particle side distribution meter NANOTRACK UPA-EX150 (manufactured by Nikkiso Co., Ltd.) and found to be 0.20 μm.

Production Example of Toner Particle 13a

First resin 6 fine particle-dispersed solution: 300 parts

Second resin 4 fine particle-dispersed solution: 200 parts

Colorant fine particle-dispersed solution: 65 parts

Wax fine particle-dispersed solution: 50 parts

Ion exchanged water: 160 parts

The materials listed above were placed in a round stainless steel flask and mixed. Next, the obtained mixed solution was dispersed for 10 minutes at 5000 rpm using a homogenizer (an Ultratarax T50 produced by IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred. The formed aggregated particles were appropriately confirmed using a Coulter Multisizer III, and when aggregated particles having a weight average particle diameter (D4) of approximately 6.00 μm were formed, the pH was adjusted to 9.0 using a 5% aqueous solution of sodium hydroxide.

The solution was then heated to 75° C. while continuing the stirring. The aggregate particles were fused together by maintaining a temperature of 75° C. for 1 hour. Crystallization of the resin was then facilitated by cooling to 50° C. and maintaining this temperature for 3 hours. The mixture was then cooled to 25° C., filtered, subjected to solid-liquid separation, and then washed with ion exchanged water. Following completion of the washing, toner particle 13a having a weight-average particle diameter (D4) of approximately 6.0 μm was obtained by drying with a vacuum dryer.

Production Example of Toner Particle 13b

Toner particle 13b was obtained by carrying out production in the same way as in the production example of toner particle 13a, except that the number of parts of the first resin 6 fine particle-dispersed solution was changed from 300 parts to 475 parts and the number of parts of the second resin 4 fine particle-dispersed solution was changed from 200 parts to 25 parts.

Production Example of First Resin 8 Fine Particle-Dispersed Solution

First resin 8 fine particle-dispersed solution was obtained by carrying out production in the same way as in the production example of first resin 6 fine particle-dispersed solution, except that first resin 6 was changed to first resin 8. The 50% particle diameter on a volume basis (D50) of the first resin 6 was measured using a dynamic light scattering particle size distribution analyzer (Nanotrac UPA-EX150 produced by Nikkiso Co., Ltd.), and found to be 0.40

Production Example of Second Resin 3 Fine Particle-Dispersed Solution

Second resin 3 fine particle-dispersed solution was obtained by carrying out production in the same way as in the production example of second resin 4 fine particle-dispersed solution, except that second resin 4 was changed to second resin 3. The 50% particle diameter on a volume basis (D50) of the second resin 3 was measured using a dynamic light scattering particle size distribution analyzer (Nanotrac UPA-EX150 produced by Nikkiso Co., Ltd.), and found to be 0.40

Production Example of Toner Particle 15a

Toner particle 15a was obtained by carrying out production in the same way as in the production example of toner particle 13a, except that the first resin 6 fine particle-dispersed solution was changed to the first resin 8 fine particle-dispersed solution and the second resin 4 fine particle-dispersed solution was changed to the second resin 3 fine particle-dispersed solution.

Production Example of Toner Particle 15b

Toner particle 15b was obtained by carrying out production in the same way as in the production example of toner particle 13b, except that the first resin 6 fine particle-dispersed solution was changed to the first resin 8 fine particle-dispersed solution and the second resin 4 fine particle-dispersed solution was changed to the second resin 3 fine particle-dispersed solution.

Production Example of Toner Particle 14a

First resin 7: 60.0 parts

Second resin 1: 40.0 parts

Hydrocarbon wax (Fischer Tropsch wax; peak temperature of maximum endothermic peak in DSC: 92° C.): 10.0 parts Pigment Blue 15:3 (produced by Dainichiseika Color and Chemicals Mfg. Co., Ltd.): 5.0 parts Toluene: 150.0 parts An oil phase was prepared by adding the solution to a container and stirring/dispersing for 5 minutes using a homodisper (produced by Tokushu Kika Kogyo Co., Ltd.) at 2000 rpm. In a separate container, 390.0 parts of a 0.1 mol/L aqueous solution of sodium phosphate ($Na_3PO_4$) was added to 1152.0 parts of ion exchanged water, and the temperature was increased to 70° C. while stirring with a Clearmix (produced by M Technique Co., Ltd.). A dispersion stabilizer comprising tricalcium phosphate ($Ca_3(PO_4)_2$) was then produced by adding 58.0 parts of a 1.0 mol/L aqueous solution of calcium chloride ($CaCl_2$)) and continuing to stir, and an aqueous medium was prepared.

Next, the oil phase was added to the aqueous phase and granulation was carried out by stirring for 10 minutes at 10,000 rpm in a nitrogen atmosphere at 60° C. using a Clearmix (produced by M Technique Co., Ltd.). Next, the obtained suspension was desolvated over a period of 5 hours in a depressurized state at a temperature of 80° C. and a pressure of 400 mbar while stirring the suspension with a paddle stirrer at a rotational speed of 150 rpm. A toner slurry 14a was then obtained by cooling the suspension to 25° C. and adding ion exchanged water so that the solid content concentration in the dispersed solution was 20 mass %. The toner slurry 14a was cooled to 25° C., hydrochloric acid was added until the pH reached 1.5, and the slurry was stirred for 2 hours. Toner particles 14a were then obtained by thoroughly washing the slurry with ion exchanged water, filtering, drying and classifying.

Production Example of Toner Particle 14b

Toner particle 14b was obtained by carrying out production in the same way as in the production example of toner particle 14a, except that the number of parts of first resin 7 was changed from 60.0 parts to 95.0 parts and the number of parts of second resin 1 was changed from 40.0 parts to 5.0 parts.

TABLE 4

| | | Toner particle a | | | | | Toner particle b | | | | |
|---|---|---|---|---|---|---|---|---|---|---|---|
| | | | Crystalline resin | | Amorphous resin | | | Crystalline resin | | Amorphous resin | |
| Toner No. | Production method | No. | No. | Number of parts | No. | Number of parts | No. | No. | Number of parts | No. | Number of parts |
| 1 | Pulverization | 1a | 1 | 50 | 1 | 50 | 1b | 1 | 95 | 1 | 5 |
| 2 | Pulverization | 2a | 1 | 50 | 2 | 50 | 2b | 1 | 95 | 2 | 5 |
| 3 | Pulverization | 3a | 1 | 50 | 1 | 50 | 3b | 1 | 95 | 1 | 5 |
| 4 | Pulverization | 4a | 2 | 50 | 1 | 50 | 4b | 2 | 95 | 1 | 5 |
| 5 | Pulverization | 5a | 3 | 50 | 1 | 50 | 5b | 3 | 95 | 1 | 5 |
| 6 | Pulverization | 6a | 4 | 50 | 1 | 50 | 6b | 4 | 95 | 1 | 5 |
| 7 | Pulverization | 7a | 3 | 40 | 1 | 60 | 7b | 3 | 95 | 1 | 5 |
| 8 | Pulverization | 8a | 3 | 32 | 1 | 68 | 8b | 3 | 95 | 1 | 5 |
| 9 | Pulverization | 9a | 3 | 72 | 1 | 22 | 9b | 3 | 95 | 1 | 5 |
| 10 | Pulverization | 10a | 3 | 60 | 1 | 40 | 10b | 3 | 95 | 1 | 5 |
| 11 | Pulverization | 11a | 5 | 60 | 1 | 40 | 11b | 5 | 95 | 1 | 5 |
| 12 | Pulverization | 12a | 1 | 50 | 3 | 50 | 12b | 1 | 95 | 3 | 5 |
| 13 | Emulsion aggregation | 13a | 6 | 60 | 4 | 40 | 13b | 6 | 95 | 4 | 5 |
| 14 | Suspension aggregation | 14a | 7 | 60 | 1 | 40 | 14b | 7 | 95 | 1 | 5 |
| 15 | Emulsion aggregation | 15a | 8 | 60 | 3 | 40 | 15b | 8 | 95 | 3 | 5 |
| 16 | Pulverization | 16a | 9 | 40 | 4 | 60 | 16b | 9 | 95 | 4 | 5 |
| 17 | Pulverization | 17a | 6 | 60 | 3 | 40 | 17b | 6 | 95 | 3 | 5 |
| 18 | Pulverization | 18a | 6 | 60 | 5 | 40 | 18b | 6 | 95 | 5 | 5 |
| 19 | Pulverization | 19a | 6 | 60 | 5 | 40 | 19b | 6 | 95 | 5 | 5 |
| 20 | Pulverization | 20a | 6 | 32 | 5 | 68 | 20b | 6 | 95 | 5 | 5 |
| 21 | Pulverization | 21a | 6 | 75 | 5 | 25 | 21b | 6 | 95 | 5 | 5 |
| 22 | Pulverization | 22a | 6 | 60 | 6 | 40 | 22b | 6 | 95 | 6 | 5 |
| 23 | Pulverization | 23a | 3 | 25 | 1 | 75 | — | — | — | — | — |
| 24 | Pulverization | 24a | 3 | 78 | 1 | 22 | — | — | — | — | — |
| 25 | Pulverization | 25a | 3 | 90 | 1 | 10 | — | — | — | — | — |
| 26 | Pulverization | 26a | 6 | 25 | 1 | 75 | — | — | — | — | — |
| 27 | Pulverization | 27a | 6 | 79 | 1 | 21 | — | — | — | — | — |
| 28 | Pulverization | 28a | 6 | 50 | 1 | 50 | — | — | — | — | — |

| | | Toner particle c | | | | | |
|---|---|---|---|---|---|---|---|
| | | | Crystalline resin | | Amorphous resin | | Mixing |
| Toner No. | Production method | No. | No. | Number of parts | No. | Number of parts | ratio a/b/c |
| 1 | Pulverization | 1c | 1 | 5 | 1 | 95 | 64/20/16 |
| 2 | Pulverization | — | — | — | — | — | 82/18/0 |
| 3 | Pulverization | — | — | — | — | — | 82/18/0 |
| 4 | Pulverization | — | — | — | — | — | 82/18/0 |
| 5 | Pulverization | — | — | — | — | — | 82/18/0 |
| 6 | Pulverization | — | — | — | — | — | 82/18/0 |
| 7 | Pulverization | — | — | — | — | — | 82/18/0 |
| 8 | Pulverization | — | — | — | — | — | 90/10/0 |
| 9 | Pulverization | — | — | — | — | — | 85/15/0 |
| 10 | Pulverization | — | — | — | — | — | 85/15/0 |
| 11 | Pulverization | — | — | — | — | — | 65/35/0 |
| 12 | Pulverization | — | — | — | — | — | 82/18/0 |

TABLE 4-continued

| | | | | | | | |
|---|---|---|---|---|---|---|---|
| 13 | Emulsion aggregation | — | — | — | — | — | 82/18/0 |
| 14 | Suspension aggregation | — | — | — | — | — | 82/18/0 |
| 15 | Emulsion aggregation | — | — | — | — | — | 82/18/0 |
| 16 | Pulverization | — | — | — | — | — | 82/18/0 |
| 17 | Pulverization | — | — | — | — | — | 82/18/0 |
| 18 | Pulverization | — | — | — | — | — | 79/21/0 |
| 19 | Pulverization | — | — | — | — | — | 65/35/0 |
| 20 | Pulverization | — | — | — | — | — | 90/10/0 |
| 21 | Pulverization | — | — | — | — | — | 70/30/0 |
| 22 | Pulverization | — | — | — | — | — | 75/25/0 |
| 23 | Pulverization | — | — | — | — | — | 100/0 |
| 24 | Pulverization | — | — | — | — | — | 100/0 |
| 25 | Pulverization | — | — | — | — | — | 100/0 |
| 26 | Pulverization | — | — | — | — | — | 100/0 |
| 27 | Pulverization | — | — | — | — | — | 100/0 |
| 28 | Pulverization | — | — | — | — | — | 100/0 |

Production Example of Toner 1

Toner particle 1a: 64 parts

Toner particle 1b: 20 parts

Toner particle 1c: 16 parts

Silica fine particles 1: 0.5 parts (hydrophobically treated silica fine particles having a number average primary particle diameter of 15 nm)

Silica fine particles 2: 1.0 parts (hydrophobically treated silica fine particles having a number average primary particle diameter of 80 nm)

Toner 1 was obtained by mixing the materials listed above in an FM-10C Henschel mixer (produced by Mitsui Miike Kakoki Corporation) at a rotational speed of 50 $s^{-1}$ and a rotation time of 10 min. Physical properties are shown in Table 5.

Production Examples of Toners 2 to 28

Toners 2 to 28 were obtained by carrying out production in the same way as in the production example of toner 1, except that the toner particle combination was changed to that shown in Table 4. Physical properties of the obtained toners are shown in Table 5.

TABLE 5

| | | Structure of cross section | | | Cross section | | |
|---|---|---|---|---|---|---|---|
| Toner No. | Weight average particle diameter [μm] | Matrix | Domain | Number average diameter of domains [μm] | Average value of area ratio A (area %) | X/Z | Y/Z |
| 1 | 6.0 | Crystalline resin | Amorphous resin | 0.8 | 50 | 0.20 | 0.15 |
| 2 | 6.0 | Phase separation occurred, but no domain-matrix structure | | | 55 | 0.17 | 0.02 |
| 3 | 6.0 | Crystalline resin | Amorphous resin | 0.7 | 55 | 0.17 | 0.02 |
| 4 | 6.0 | Crystalline resin | Amorphous resin | 0.6 | 55 | 0.17 | 0.02 |
| 5 | 6.0 | Crystalline resin | Amorphous resin | 0.5 | 55 | 0.17 | 0.02 |
| 6 | 6.0 | Crystalline resin | Amorphous resin | 0.3 | 55 | 0.17 | 0.02 |
| 7 | 6.0 | Crystalline resin | Amorphous resin | 0.7 | 50 | 0.17 | 0.02 |
| 8 | 6.0 | Crystalline resin | Amorphous resin | 0.6 | 32 | 0.15 | 0.03 |
| 9 | 6.0 | Crystalline resin | Amorphous resin | 0.7 | 72 | 0.28 | 0.01 |
| 10 | 6.0 | Crystalline resin | Amorphous resin | 0.8 | 65 | 0.17 | 0.02 |
| 11 | 6.0 | Crystalline resin | Amorphous resin | 0.6 | 70 | 0.36 | 0.02 |
| 12 | 6.0 | Crystalline resin | Amorphous resin | 0.5 | 55 | 0.19 | 0.02 |
| 13 | 6.0 | Crystalline resin | Amorphous resin | 1.0 | 62 | 0.20 | 0.02 |
| 14 | 6.0 | Crystalline resin | Amorphous resin | 1.1 | 62 | 0.20 | 0.02 |
| 15 | 6.0 | Crystalline resin | Amorphous resin | 0.6 | 62 | 0.20 | 0.02 |
| 16 | 6.0 | Crystalline resin | Amorphous resin | 0.8 | 45 | 0.18 | 0.02 |
| 17 | 6.0 | Crystalline resin | Amorphous resin | 0.3 | 60 | 0.17 | 0.02 |
| 18 | 6.0 | Crystalline resin | Amorphous resin | 0.5 | 65 | 0.25 | 0.02 |
| 19 | 6.0 | Crystalline resin | Amorphous resin | 0.5 | 68 | 0.40 | 0.02 |
| 20 | 6.0 | Crystalline resin | Amorphous resin | 0.6 | 34 | 0.18 | 0.03 |
| 21 | 6.0 | Crystalline resin | Amorphous resin | 0.4 | 75 | 0.35 | 0.01 |
| 22 | 6.0 | Crystalline resin | Amorphous resin | 0.7 | 60 | 0.24 | 0.02 |
| 23 | 6.0 | Amorphous resin | Crystalline resin | 0.8 | 25 | 0.00 | 0.11 |
| 24 | 6.0 | Crystalline resin | Amorphous resin | 0.6 | 78 | 0.14 | 0.01 |
| 25 | 6.0 | Crystalline resin | Amorphous resin | 0.3 | 90 | 0.50 | 0.00 |
| 26 | 6.0 | Amorphous resin | Crystalline resin | 1.2 | 25 | 0.00 | 0.11 |
| 27 | 6.0 | Crystalline resin | Amorphous resin | 0.6 | 79 | 0.14 | 0.01 |
| 28 | 6.0 | Crystalline resin | Amorphous resin | 0.5 | 50 | 0.05 | 0.02 |

The number average diameter of the domains is the number average length of the long axes of the domains.

Production Example of Magnetic Carrier 1

Magnetite 1; number average particle diameter: 0.30 μm (intensity of magnetization in a magnetic field of 1000/4π (kA/m): 65 $Am^2/kg$)

Magnetite 2; number average particle diameter: 0.50 μm (intensity of magnetization in a magnetic field of 1000/4π (kA/m): 65 $Am^2/kg$)

4.0 parts of a silane compound (3-(2-aminoethylamino-propyl)trimethoxysilane) was added to 100 parts of each of the materials listed above, and subjected to high speed mixing and agitation at a temperature of at least 100° C. in a container so as to treat the fine particles.

Phenol: 10 mass %

Formaldehyde solution: 6 mass % (40 mass % of form-aldehyde, 10 mass % of methanol and 50 mass % of water)

Magnetite 1 treated with the silane compound mentioned above: 58 mass %

Magnetite 2 treated with the silane compound mentioned above: 26 mass %

100 parts of the materials listed above, 5 parts of a 28 mass % aqueous solution of ammonia and 20 parts of water were placed in a flask, the temperature was increased to 85° C. and held at this temperature for a period of 30 minutes while agitating and mixing, a polymerization reaction was carried out for 3 hours, and the obtained phenol resin was cured. The cured phenol resin was then cooled to 30° C., water was added, the supernatant liquid was removed, and the obtained precipitate was washed with water and air dried. Next, spherical magnetic carrier 1 was obtained in the form of a magnetic material dispersion by drying the precipitate at a temperature of 60° C. under reduced pressure (not more than 5 mm Hg). The 50% particle diameter on a volume basis (D50) of magnetic carrier 1 was 34.2 μm.

<Production Example of Two-Component Developer 1>

A total of 8.0 parts of toner 1 was added to 92.0 parts of the magnetic carrier 1 and mixing was performed with a V-type mixer (V-20, manufactured by Seishin Enterprise Co., Ltd.) to obtain a two-component developer 1.

Production Examples of Two Component Developers 2 to 28

Two component developers 2 to 28 were obtained by carrying out production in the same way as in the production example of two component developer 1, except that the toner was changed in the manner shown in Table 6.

TABLE 6

| Two component developer | Toner particle | Carrier |
|---|---|---|
| Two component developer 1 | Toner 1 | Carrier 1 |
| Two component developer 2 | Toner 2 | Carrier 1 |
| Two component developer 3 | Toner 3 | Carrier 1 |
| Two component developer 4 | Toner 4 | Carrier 1 |
| Two component developer 5 | Toner 5 | Carrier 1 |
| Two component developer 6 | Toner 6 | Carrier 1 |
| Two component developer 7 | Toner 7 | Carrier 1 |
| Two component developer 8 | Toner 8 | Carrier 1 |
| Two component developer 9 | Toner 9 | Carrier 1 |
| Two component developer 10 | Toner 10 | Carrier 1 |
| Two component developer 11 | Toner 11 | Carrier 1 |
| Two component developer 12 | Toner 12 | Carrier 1 |
| Two component developer 13 | Toner 13 | Carrier 1 |
| Two component developer 14 | Toner 14 | Carrier 1 |
| Two component developer 15 | Toner 15 | Carrier 1 |
| Two component developer 16 | Toner 16 | Carrier 1 |
| Two component developer 17 | Toner 17 | Carrier 1 |
| Two component developer 18 | Toner 18 | Carrier 1 |

TABLE 6-continued

| Two component developer | Toner particle | Carrier |
|---|---|---|
| Two component developer 19 | Toner 19 | Carrier 1 |
| Two component developer 20 | Toner 20 | Carrier 1 |
| Two component developer 21 | Toner 21 | Carrier 1 |
| Two component developer 22 | Toner 22 | Carrier 1 |
| Two component developer 23 | Toner 23 | Carrier 1 |
| Two component developer 24 | Toner 24 | Carrier 1 |
| Two component developer 25 | Toner 25 | Carrier 1 |
| Two component developer 26 | Toner 26 | Carrier 1 |
| Two component developer 27 | Toner 27 | Carrier 1 |
| Two component developer 28 | Toner 28 | Carrier 1 |

Example 1

Evaluation was performed using the two-component developer 1. As an image forming apparatus, a modified Canon printer imageRUNNER ADVANCE C5560 for digital commercial printing was used, and the two-component developer 1 was put into a cyan developing device. The printer was modified so that the fixing temperature, the process speed, the DC voltage VDC of the developer bearing member, the charging voltage VD of the electrostatic latent image bearing member, and the laser power could be freely set. In the image output evaluation, an FFh image (solid image) having a desired image ratio was output, the VDC, VD, and laser power were adjusted to obtain the desired toner laid-on level on the FFh image on paper, and the below-described evaluation was performed. FFh is a value in which 256 gradations are displayed in hexadecimal, 00h is the first gradation (white background portion) of 256 gradations, and FFh is the 256th gradation (solid portion) of 256 gradations. The evaluation is based on the following evaluation methods, and the results are shown in Table 7.

<Low-Temperature Fixability>

Paper: GFC-081 (81.0 $g/m^2$)

(Sold by Canon Marketing Japan Inc.)

Toner laid-on level on paper: 0.70 $mg/cm^2$ (Adjusted by the DC voltage VDC of the developer bearing member, the charging voltage VD of the electrostatic latent image bearing member, and the laser power)

Evaluation image: an image of 2 cm×15 cm placed in the center of the A4 paper

Test environment: low-temperature and low-humidity environment: temperature 15° C./humidity 10% RH (hereinafter "L/L")

Fixing temperature: 140° C.

Process speed: 400 mm/sec

The evaluation image mentioned above was outputted and low-temperature fixability was evaluated. The image density decrease rate was used as an indicator for evaluating low-temperature fixability. The image density decrease rate was first measured for image density in a central part of an image using an X-Rite color reflection densitometer (500 Series produced by X-Rite). Next, the fixed image on the part whose image density has been measured was rubbed (back and forth ten times) with a lens-cleaning paper while applying a load of 4.9 kPa (50 $g/cm^2$), after which the image density was measured again. Next, the rate of decrease in image density before and after the rubbing was calculated using the formula below. The obtained image density decrease rate was evaluated according to the evaluation criteria shown below.

Image density decrease rate=(image density before rubbing−image density after rubbing)/(image density before rubbing)×100

Evaluation Criteria

A: Image density decrease rate of less than 1.0%

B: Image density decrease rate of at least 1.0% but less than 5.0%

C: Image density decrease rate of at least 5.0% but less than 8.0%

D: Image density decrease rate of at least 8.0%

Hot Offset Resistance

Paper: CS-064 (64.0 g/$m^2$)

(sold by Canon Marketing Japan K.K.)

Toner laid-on level on paper: 0.08 mg/$cm^2$ (Adjusted by altering the direct current voltage VDC of the developer bearing member, the charging voltage VD of the electrostatic latent image bearing member and the laser power)

Evaluation image: An image measuring 2 cm×20 cm was disposed at the long edge in the paper passing direction an A4 sheet of the paper mentioned above in such a way as to leave a margin of 2 mm from the edge of the paper Test environment: Normal temperature low humidity environment (temperature: 23° C., humidity: 5% RH) (hereinafter abbreviated to "N/L")

Fixation temperature: Temperature increase in increments of 5° C. from 140° C.

Processing speed: 400 mm/sec

The evaluation image mentioned above was outputted, and hot offset resistance was evaluated on the basis of the criteria below in terms of the maximum fixation temperature at which hot offsetting did not occur.

Evaluation Criteria

A: At least 170° C.

B: At least 160° C. but lower than 170° C.

C: At least 145° C. but lower than 160° C.

D: Lower than 145° C.

Image Gloss

Paper: GFC-081 (81.0 g/$m^2$)

(sold by Canon Marketing Japan K.K.)

Toner laid-on level on paper: 0.40 mg/$cm^2$ (Adjusted by altering the direct current voltage VDC of the developer bearing member, the charging voltage VD of the electrostatic latent image bearing member and the laser power)

Evaluation image: An image measuring 2 cm×5 cm was disposed in the center of an A4 sheet of the paper mentioned above Test environment: Temperature: 23° C., humidity: 50% RH Fixation temperature: 160° C.

Processing speed: 400 mm/sec

The evaluation image mentioned above was outputted and image gloss was evaluated. Image gloss was evaluated by measuring at a single angle of 60° using a handy gloss meter (PG-1M produced by Tokyo Denshoku Co., Ltd.), and this measured value was evaluated as the gloss value.

Evaluation Criteria for Image Gloss

A: Not less than 8

B: Not less than 5 but less than 8

C: Not less than 2 but less than 5

D: Less than 2

Charging Performance in High Temperature High Humidity Environment (Charge Maintaining Properties)

A toner on an electrostatic latent image bearing member was collected through suction using a cylindrical metal pipe and a cylindrical filter, and the triboelectric charge amount of the toner was calculated. Specifically, the triboelectric charge amount of the toner on the electrostatic latent image bearing member was measured using a Faraday Cage. The Faraday cage is a coaxial double cylinder, with the inner cylinder being insulated from the outer cylinder. When a charged body having a charge amount Q is placed inside the inner cylinder, it is as if a metal cylinder having the charge amount Q is present as a result of electrostatic induction. This induced charge amount was measured using an electrometer (Keithley 6517A produced by Keithley), and the triboelectric charge amount of the toner was determined by dividing the charge amount Q (mC) by the mass of toner M (kg) in the inner cylinder, that is, (Q/M).

$$\text{Triboelectric charge amount of toner (mC/kg)} = Q/M$$

Firstly, an evaluation image used for hot offset resistance was formed on an electrostatic latent image bearing member, rotation of the electrostatic latent image bearing member was stopped before the image was transferred to an intermediate transfer member, toner on the electrostatic latent image bearing member was collected through suction using a cylindrical metal pipe and a cylindrical filter, and the "initial Q/M" was measured. Next, the developing device was allowed to rest for 2 weeks in an evaluation apparatus in a high temperature high humidity (H/H) environment (32° C., 80% RH), after which the same procedure as that carried out before being allowed to rest was carried out, and the charge per unit mass on the electrostatic latent image bearing member after being allowed to rest (Q/M (mC/kg)) was measured. The value of Q/M per unit mass on the electrostatic latent image bearing member before being allowed to rest is denoted by "initial Q/M" and the value of Q/M per unit mass on the electrostatic latent image bearing member after being allowed to rest is denoted by "Q/M after rest", and the value of ("Q/M after rest"/"initial Q/M"×100) was calculated as the charge retention rate and assessed according to the criteria shown below.

Evaluation Criteria

A: Charge retention rate of not less than 85%

B: Charge retention rate of not less than 80% but less than 85%

C: Charge retention rate of not less than 70% but less than 80%

D: Charge retention rate of less than 70%

Rubfastness (Image Strength)

Evaluation paper: Image Coat Gloss 158 (158.0 g/$m^2$)

(sold by Canon Marketing Japan K.K.)

Toner laid-on level on paper: 0.10 mg/$cm^2$ (Adjusted by altering the direct current voltage VDC of the developer bearing member, the charging voltage VD of the electrostatic latent image bearing member and the laser power)

Evaluation image: An image measuring 3 cm×15 cm was disposed in the center of an A4 sheet of the paper mentioned above Fixing test environment: Normal temperature normal humidity environment (temperature: 23° C., humidity: 50% RH) (hereinafter abbreviated to "N/N")

Fixation temperature: 160° C.

Processing speed: 400 mm/sec

The evaluation image mentioned above was outputted and rubfastness was evaluated. Difference in reflectance was used as an indicator for evaluating rubfastness. Firstly, a load of 0.5 kgf is applied to the image portion of the evaluation image using a Color Fastness Rubbing Tester (AB-301 produced by Tester Sangyo Co., Ltd.), and a fresh evaluation paper is rubbed (back and forth ten times). Next, using a reflectometer (a REFLECTOMETER MODEL TC-6DS produced by Tokyo Denshoku Co., Ltd.), the reflectance of rubbed parts and the reflectance of non-rubbed parts are measured using fresh evaluation paper. Next, the difference in reflectance before and after rubbing was calculated using the formula below. The obtained difference in reflectance was evaluated according to the evaluation criteria shown below.

Difference in reflectance=reflectance before rubbing−reflectance after rubbing

Evaluation Criteria

A: Less than 2.0%

B: Not less than 2.0% but less than 4.0%

C: Not less than 4.0% but less than 6.0%

D: Not less than 6.0%

Working Examples 2 to 22 and Comparative Examples 1 to 6

Evaluations were carried out in the same way as for Working Example 1, except that two component developers 2 to 28 were used instead of two component developer 1. The evaluation results are shown in Table 7.

TABLE 7

| | Two component developer | Low temperature fixabilily (image density decrease rale) | | Hot offset resistance (highest fixing temperature) | | Image gloss (gloss value) | | HH charge retention rate (charge retention rate) | | Image strength (difference in reflectance) | |
|---|---|---|---|---|---|---|---|---|---|---|---|
| | No. | % | Rank | ° C. | Rank | — | Rank | % | Rank | % | Rank |
| Example 1 | 1 | 0.2 | A | 180 | A | 10 | A | 88 | A | 1.5 | A |
| Example 2 | 2 | 0.1 | A | 175 | A | 7 | B | 86 | A | 3.2 | B |
| Example 3 | 3 | 0.3 | A | 175 | A | 10 | A | 88 | A | 2.8 | B |
| Example 4 | 4 | 0.3 | A | 175 | A | 10 | A | 88 | A | 2.4 | B |
| Example 5 | 5 | 0.3 | A | 175 | A | 12 | A | 88 | A | 3.3 | B |
| Example 6 | 6 | 6.5 | C | 175 | A | 8 | A | 87 | A | 3.6 | B |
| Example 7 | 7 | 3.4 | B | 175 | A | 12 | A | 88 | A | 3.2 | B |
| Example 8 | 8 | 7.0 | C | 175 | A | 12 | A | 88 | A | 2.4 | B |
| Example 9 | 9 | 0.4 | A | 175 | A | 12 | A | 88 | A | 2.8 | B |
| Example 10 | 10 | 0.4 | A | 175 | A | 12 | A | 88 | A | 2.5 | B |
| Example 11 | 11 | 0.1 | A | 175 | A | 12 | A | 88 | A | 3.1 | B |
| Example 12 | 12 | 0.6 | A | 175 | A | 10 | A | 90 | A | 3.6 | B |
| Example 13 | 13 | 0.7 | A | 165 | B | 10 | A | 83 | B | 3.5 | B |
| Example 14 | 14 | 0.7 | A | 165 | B | 10 | A | 83 | B | 3.2 | B |
| Example 15 | 15 | 0.8 | A | 165 | B | 10 | A | 81 | B | 3.9 | B |
| Example 16 | 16 | 2.0 | B | 160 | B | 10 | A | 82 | B | 2.8 | B |
| Example 17 | 17 | 0.8 | A | 155 | C | 10 | A | 81 | B | 2.6 | B |
| Example 18 | 18 | 0.8 | A | 160 | B | 10 | A | 83 | B | 3.2 | B |
| Example 19 | 19 | 0.8 | A | 160 | B | 10 | A | 81 | B | 3.2 | B |
| Example 20 | 20 | 7.0 | C | 165 | B | 10 | A | 81 | B | 3.2 | B |
| Example 21 | 21 | 0.8 | A | 160 | B | 6 | B | 77 | C | 3.7 | B |
| Example 22 | 22 | 7.5 | C | 160 | B | 3 | C | 82 | B | 3.8 | B |
| Comparative Example 1 | 23 | 12.0 | D | 160 | B | 6 | B | 86 | A | 7.5 | D |
| Comparative Example 2 | 24 | 0.6 | A | 140 | D | 6 | B | 86 | A | 8.2 | D |
| Comparative Example 3 | 25 | 0.6 | A | 135 | D | 6 | B | 86 | A | 3.2 | B |
| Comparative Example 4 | 26 | 15.0 | D | 160 | B | 6 | B | 82 | B | 7 | D |
| Comparative Example 5 | 27 | 0.7 | A | 140 | D | 6 | B | 81 | B | 7.3 | D |
| Comparative Example 6 | 28 | 0.7 | A | 140 | D | 4 | C | 81 | B | 7.5 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-059005, filed Mar. 31, 2021, which is hereby incorporated by reference herein in its entirety.

What is claimed is:

1. A toner comprising a toner particle comprising a binder resin, wherein the binder resin comprises a first resin and a second resin, the first resin is a crystalline resin, the second resin is an amorphous resin, and in observations of cross sections of 100 toner particles using a transmission electron microscope, (i) when an area ratio A (area %) denotes a ratio of an area occupied by the first resin in each of cross sections of the toner particles, an average value of the area ratio A is 30 to 75 area %, and (ii) when X denotes the number of cross sections of the toner particle for which the area ratio A is 90 area % or more and Z denotes the total number of cross sections of observed toner particles, then a value of X/Z is 0.15 or more.

2. The toner according to claim 1, wherein the second resin is at least one resin selected from a group consisting of a hybrid resin in which a polyester resin is bound to a vinyl resin, a polyester resin, and a vinyl resin.

3. The toner according to claim 1, wherein the first resin comprises a first monomer unit represented by formula (1) below:

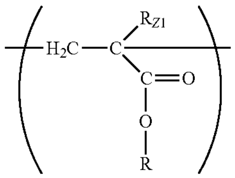

(1)

in formula (1), $R_{Z1}$ denotes a hydrogen atom or a methyl group, and R denotes an alkyl group having 18 to 36 carbon atoms.

4. The toner according to claim 3, wherein the first resin is a vinyl resin having the first monomer unit.

5. The toner according to claim 3, wherein a content of the first monomer unit in the first resin is 20.0 to 100.0 mass %.

6. The toner according to claim 1, wherein in an observation of a cross section of the toner particle using a transmission electron microscope, a cross section of a toner particle for which the area ratio A is 30 to 70 area % comprises a matrix-domain structure constituted from a matrix comprising the first resin and domains comprising the second resin.

7. The toner according to claim 6, wherein the number average length of long axes of the domains is 0.5 to 1.4 μm.

8. The toner according to claim 1, wherein in observations of cross sections of 100 toner particles using a transmission electron microscope, when an area ratio B (area %) denotes a ratio of an area occupied by the second resin in each of cross sections of the toner particles, and Y denotes the number of cross sections of toner particles for which the area ratio B is 90 area % or more, then a value of Y/Z is 0.10 or more.

* * * * *